US012044447B2

(12) United States Patent
Nelson et al.

(10) Patent No.: US 12,044,447 B2
(45) Date of Patent: Jul. 23, 2024

(54) COOLING SYSTEM AND METHOD

(71) Applicant: NITROcrete, LLC, Fort Collins, CO (US)

(72) Inventors: Mark Nelson, Johnstown, CO (US); Drew Nelson, Johnstown, CO (US)

(73) Assignee: Nitrocrete IP, LLC, Fort Collins, CO (US)

( * ) Notice: Subject to any disclaimer, the term of this patent is extended or adjusted under 35 U.S.C. 154(b) by 564 days.

(21) Appl. No.: 16/492,101

(22) PCT Filed: Jan. 29, 2018

(86) PCT No.: PCT/US2018/015801
§ 371 (c)(1),
(2) Date: Jan. 3, 2020

(87) PCT Pub. No.: WO2018/164779
PCT Pub. Date: Sep. 13, 2018

(65) Prior Publication Data

US 2020/0338511 A1 Oct. 29, 2020

Related U.S. Application Data

(60) Provisional application No. 62/467,456, filed on Mar. 6, 2017, provisional application No. 62/520,550, filed on Jun. 15, 2017.

(51) Int. Cl.
*B01F 15/06* (2006.01)
*B01F 9/02* (2006.01)
(Continued)

(52) U.S. Cl.
CPC ............ *F25B 19/005* (2013.01); *B01F 29/60* (2022.01); *B01F 33/5021* (2022.01);
(Continued)

(58) Field of Classification Search
CPC .............................. B28C 7/0038; B28C 5/468
See application file for complete search history.

(56) References Cited

U.S. PATENT DOCUMENTS 2,727,734 A 12/1955 Vincent
3,277,664 A 10/1966 Goldfarb
(Continued)

FOREIGN PATENT DOCUMENTS

DE 3941262 C1 8/1991
DE 102004010129 B3 9/2005
(Continued)

OTHER PUBLICATIONS

Espacenet translation of Debruyn, Ludwig (EP1152183A1), published Nov. 7, 2001 (Year: 2001).*
(Continued)

*Primary Examiner* — Elizabeth Insler
(74) *Attorney, Agent, or Firm* — Taft Stettinius & Hollister LLP

(57) ABSTRACT

In accordance with one embodiment, a method is provided that includes providing a liquid nitrogen storage system configured to cool a supply of liquid nitrogen to a temperature below the vapor point of liquid nitrogen; coupling a piping system with the liquid nitrogen storage system to convey a portion of the supply of liquid nitrogen from the liquid nitrogen storage system; coupling the piping system with a liquid nitrogen control valve configured to control a flow of liquid nitrogen to at least one liquid nitrogen dispensing head; disposing the at least one liquid nitrogen dispensing head above a conveyance device operable to convey an aggregate stream of a concrete batching plant during use; and disposing the at least one liquid nitrogen
(Continued)

dispensing head in a position to dispense an output flow of liquid nitrogen onto the aggregate stream of the concrete batching plant during use.

13 Claims, 14 Drawing Sheets

(51) Int. Cl.

| | |
|---|---|
| ***B01F 13/00*** | (2006.01) |
| ***B01F 29/60*** | (2022.01) |
| ***B01F 33/502*** | (2022.01) |
| ***B01F 35/91*** | (2022.01) |
| ***B28C 5/42*** | (2006.01) |
| ***B28C 5/46*** | (2006.01) |
| ***B28C 7/00*** | (2006.01) |
| ***F25B 19/00*** | (2006.01) |
| *B01F 35/90* | (2022.01) |
| *B01F 101/28* | (2022.01) |

(52) U.S. Cl.

CPC ............ *B01F 35/91* (2022.01); *B28C 5/4268* (2013.01); *B28C 5/468* (2013.01); *B28C 7/0038* (2013.01); *B01F 2035/98* (2022.01); *B01F 2101/28* (2022.01)

(56) References Cited

U.S. PATENT DOCUMENTS

| | | | | |
|---|---|---|---|---|
| 4,517,814 | A * | 5/1985 | Rothstein | F25D 3/11 62/380 |
| 4,881,280 | A | 11/1989 | Lesikar | |
| 5,100,239 | A * | 3/1992 | Ono | B28C 5/468 366/108 |
| 5,152,605 | A | 10/1992 | Yamada | |
| 5,201,184 | A | 4/1993 | Roth | |
| 5,220,732 | A | 6/1993 | Lee | |
| 5,477,691 | A | 12/1995 | White | |
| 5,630,321 | A | 5/1997 | Miller | |
| 6,876,904 | B2 | 4/2005 | Oberg | |
| 6,912,858 | B2 | 5/2005 | White | |
| 7,050,886 | B2 | 5/2006 | Oberg | |
| 2004/0050301 | A1 | 3/2004 | Lindner | |
| 2005/0262852 | A1 | 12/2005 | Amundsen | |
| 2007/0068176 | A1 | 3/2007 | Pozivil | |
| 2007/0171764 | A1 | 7/2007 | Klein | |
| 2008/0078189 | A1 | 4/2008 | Ando | |
| 2009/0103392 | A1 | 4/2009 | Bilger | |
| 2011/0198369 | A1 | 8/2011 | Klein | |
| 2012/0055592 | A1 | 8/2012 | Zurecki et al. | |
| 2014/0373755 | A1 | 12/2014 | Forgeron | |

FOREIGN PATENT DOCUMENTS

| | | | | |
|---|---|---|---|---|
| DE | 102004021061 | A1 | 11/2005 | |
| EP | 0436140 | A1 | 7/1991 | |
| EP | 1152183 | A1 | 7/2001 | |
| EP | 1152183 | A1 * | 11/2001 | F17C 13/04 |
| EP | 2868635 | A1 | 5/2015 | |
| FR | 2281815 | A1 | 3/1976 | |
| JP | 1026407 | | 1/1988 | |
| JP | 1026407 | A | 1/1988 | |
| JP | 1026408 | | 1/1988 | |
| JP | 1026408 | A | 1/1988 | |
| JP | 2840655 | | 5/1990 | |
| JP | 2840655 | B2 | 12/1998 | |
| WO | WO 9003875 | A1 | 4/1990 | |
| WO | 2004003672 | | 1/2004 | |

OTHER PUBLICATIONS

International Searching Authority/U.S. Written Opinion of the International Searching Authority (WO) and Search History for corresponding PCT/US2018/015801 entitled "Cooling System and Method"; dated Apr. 13, 2018 form US International Searching Authority, 19 pages.

European Patent Office, Extended European Search Report, mailed in relationship to European Application No. 18763966.1, mailed Nov. 25, 2020 (16 pages).

* cited by examiner

COOLING SYSTEM AND METHOD

CROSS-REFERENCE TO RELATED APPLICATIONS

This application is a national phase application under 35 U.S.C. § 371 and claims the benefit of U.S. Provisional Patent Application No. 62/467,456, titled "METHOD AND APPARATUS FOR COOLING" and filed on Mar. 6, 2017, as well as U.S. Provisional Patent Application No. 62/520,550, titled "METHOD AND APPARATUS FOR COOLING" filed on Jun. 15, 2017 which are each hereby incorporated by reference in their entirety and for all purposes.

FIELD OF THE DISCLOSURE

Exemplary embodiments of the present disclosure relate to methods and systems for cooling. The embodiments are particularly well-suited for cooling aggregate, such as aggregate that is to be used in concrete.

BACKGROUND

When the ingredients that constitute concrete are added together, an exothermic reaction takes place—thus producing heat that warms the concrete mixture. The concrete mixture will not cure properly if too much heat is present. This improper curing can cause problems for building projects. Particularly in warm areas of the world, such as the southern United States, this can cause significant problems for building projects. This is especially true when mass concrete pours are part of a construction project. For example, when 2000 cubic yards of concrete are poured in a massive block, the heat generated by the concrete mixture cannot dissipate and therefore the concrete will not cure properly and will be defective.

SUMMARY

In accordance with one embodiment, a system includes a liquid nitrogen storage system configured to cool a supply of liquid nitrogen to a temperature below the vapor point of liquid nitrogen; a piping system coupled with the liquid nitrogen storage system to convey a portion of the supply of liquid nitrogen from the liquid nitrogen storage system; at least one liquid nitrogen dispensing head configured to receive the portion of liquid nitrogen via the piping system; a liquid nitrogen control valve configured to control a flow of liquid nitrogen to the dispensing head; wherein the at least one liquid nitrogen dispensing head is configured to be disposed above a conveyance device to convey an aggregate stream of a concrete batching plant; and, wherein the at least one liquid nitrogen dispensing head is configured to dispense an output flow of liquid nitrogen onto the aggregate stream of the concrete batching plant during use.

In accordance with another embodiment, a method includes providing a liquid nitrogen storage system configured to cool a supply of liquid nitrogen to a temperature below the vapor point of liquid nitrogen; coupling a piping system with the liquid nitrogen storage system to convey a portion of the supply of liquid nitrogen from the liquid nitrogen storage system; coupling the piping system with a liquid nitrogen control valve configured to control a flow of liquid nitrogen to at least one liquid nitrogen dispensing head; disposing the at least one liquid nitrogen dispensing head above a conveyance device operable to convey an aggregate stream of a concrete batching plant during use; and, disposing the at least one liquid nitrogen dispensing head in a position to dispense an output flow of liquid nitrogen onto the aggregate stream of the concrete batching plant during use.

In accordance with another embodiment, a system includes a liquid nitrogen dispenser; wherein the liquid nitrogen dispenser is configured to be disposed above a conveyance device to convey an aggregate stream of a concrete batching plant; and, wherein the liquid nitrogen dispenser is configured to dispense an output flow of liquid nitrogen onto the aggregate stream carried by the conveyance device of the concrete batching plant during use.

In accordance with another embodiment, a method includes positioning a liquid-nitrogen-curtain-generator and a conveyance device in proximity to one another; loading some aggregate onto the conveyance device; moving the aggregate with the conveyance device; initiating a flow of a curtain of liquid nitrogen as an output from the liquid-nitrogen-curtain-generator; projecting from an end of the conveyance device at least a portion of the aggregate into the curtain of liquid nitrogen so as to form liquid-nitrogen-cooled-aggregate; and, dispensing the liquid-nitrogen-cooled-aggregate into a chamber.

In accordance with another embodiment, a method includes positioning a liquid-nitrogen-curtain-generator and a conveyance device in proximity to one another; wherein during use the conveyance device is positioned to project aggregate from an end of the conveyance device and through a curtain of liquid nitrogen so as to form liquid-nitrogen-cooled-aggregate; designating a vehicle loading area in proximity to the liquid-nitrogen-curtain-generator, wherein a vehicle positioned in the vehicle loading area during use can receive the liquid-nitrogen-cooled aggregate.

In accordance with another embodiment, a method includes adding aggregate to a mixing chamber; adding water to the mixing chamber; adding cement to the mixing chamber; forming a mixture of material in the mixing chamber; adding liquid nitrogen directly to the mixture of material as the aggregate is added to the mixing chamber; and, mixing at least a portion of the liquid nitrogen into the mixture of material.

In accordance with another embodiment, a method includes receiving an input of liquid nitrogen under a first pressure and having a first velocity; exposing the received liquid nitrogen to a second pressure, the second pressure lower than the first pressure; reducing the magnitude of the velocity of the received liquid nitrogen; and, flowing the received liquid nitrogen over an edge of an output port so as to form a liquid-nitrogen-curtain.

In accordance with another embodiment, a method includes storing liquid nitrogen in a storage container; coupling a pipeline between the storage container and an aggregate-cooling-liquid-nitrogen-distribution-device; sub-cooling a portion of the liquid nitrogen in the storage container; dispensing the sub-cooled liquid nitrogen to the pipeline.

In accordance with another embodiment, a method includes providing a curtain of liquid nitrogen; and, flowing the aggregate into the curtain of liquid nitrogen.

In accordance with another embodiment, a system includes a liquid-nitrogen-curtain-generator configured to output a curtain of liquid nitrogen during use; a conveyance device located proximate to the liquid-nitrogen-curtain-generator; an end of the conveyance device located proximate to the liquid-nitrogen-curtain-generator—wherein the conveyance device is configured to move some aggregate during use; and, project from the end of the conveyance device at least a portion of the aggregate into the curtain of liquid nitrogen so as to form liquid-nitrogen-cooled-aggregate—and, wherein during use the system is configured to dispense liquid-nitrogen-cooled-aggregate into a chamber.

In accordance with another embodiment, a system includes a liquid-nitrogen-curtain-generator configured to output a curtain of liquid nitrogen during use; a conveyance device located proximate to the liquid-nitrogen-curtain-generator; an end of the conveyance device located proximate to the liquid-nitrogen-curtain-generator; wherein the conveyance device is configured to project from the end of the conveyance device at least a portion of the aggregate into the curtain of liquid nitrogen so as to form liquid-nitrogen-cooled-aggregate; and, a vehicle loading area in proximity to the liquid-nitrogen-curtain-generator, wherein a vehicle positioned in the vehicle loading area during use can receive the liquid-nitrogen-cooled aggregate.

In accordance with another embodiment, an article of manufacture in the form of a concrete mixture comprises aggregate; cement; water; and, liquid nitrogen carried into the mixture during an addition of some of the aggregate to the mixture.

In accordance with another embodiment, an article of manufacture in the form of a concrete mixture comprises aggregate cooled by liquid nitrogen prior to addition to the concrete mixture; cement; and water.

In accordance with another embodiment, an apparatus includes an input port to receive an input flow of liquid nitrogen, the liquid nitrogen being under a first pressure and having a first velocity during use; a chamber under a second pressure, the second pressure being lower than the first pressure; a deflector located within the chamber, the deflector operative during use to deflect the input flow of liquid nitrogen; an output port having an edge of pre-determined length to facilitate an output flow of liquid nitrogen; and, wherein during use the output flow of liquid nitrogen flowing over the edge forms a liquid-nitrogen-curtain.

In accordance with another embodiment, an apparatus includes a storage container capable of storing liquid nitrogen; an aggregate-cooling-liquid-nitrogen-distribution-device; a pipeline coupling the storage container with the aggregate-cooling-liquid-nitrogen-distribution-device; and, a sub-cooling control circuit operable to sub-cool liquid nitrogen stored in the storage container prior to dispensing the sub-cooled liquid nitrogen to the pipeline.

In accordance with another embodiment, a system includes a first device configured to provide a curtain of liquid nitrogen; and, a second device configured to flow aggregate into the curtain of liquid nitrogen.

In accordance with another embodiment, an apparatus includes a converter to convert a pressurized input of liquid nitrogen to an unpressurized flow of liquid nitrogen; and, an output port to output the unpressurized liquid nitrogen as a curtain of liquid nitrogen through which the aggregate can be flowed.

Further embodiments will be apparent to those of ordinary skill in the art from a consideration of the following description taken in conjunction with the accompanying drawings, wherein certain methods, apparatuses, and articles of manufacture are illustrated. This Summary is provided to introduce a selection of concepts in a simplified form that are further described below in the description. This Summary is not intended to identify key features or essential features of the claimed subject matter nor is this Summary intended to be used to limit the scope of the claimed subject matter. Other features, details, utilities, and implementations of the claimed subject matter will be apparent from the following more particular written description of various embodiments as further illustrated in the accompanying drawings and defined in the appended claims.

BRIEF DESCRIPTION OF THE DRAWINGS

A further understanding of the nature and advantages of the present technology may be realized by reference to the figures, which are described in the remaining portion of the specification.

DETAILED DESCRIPTION

Figure 1:
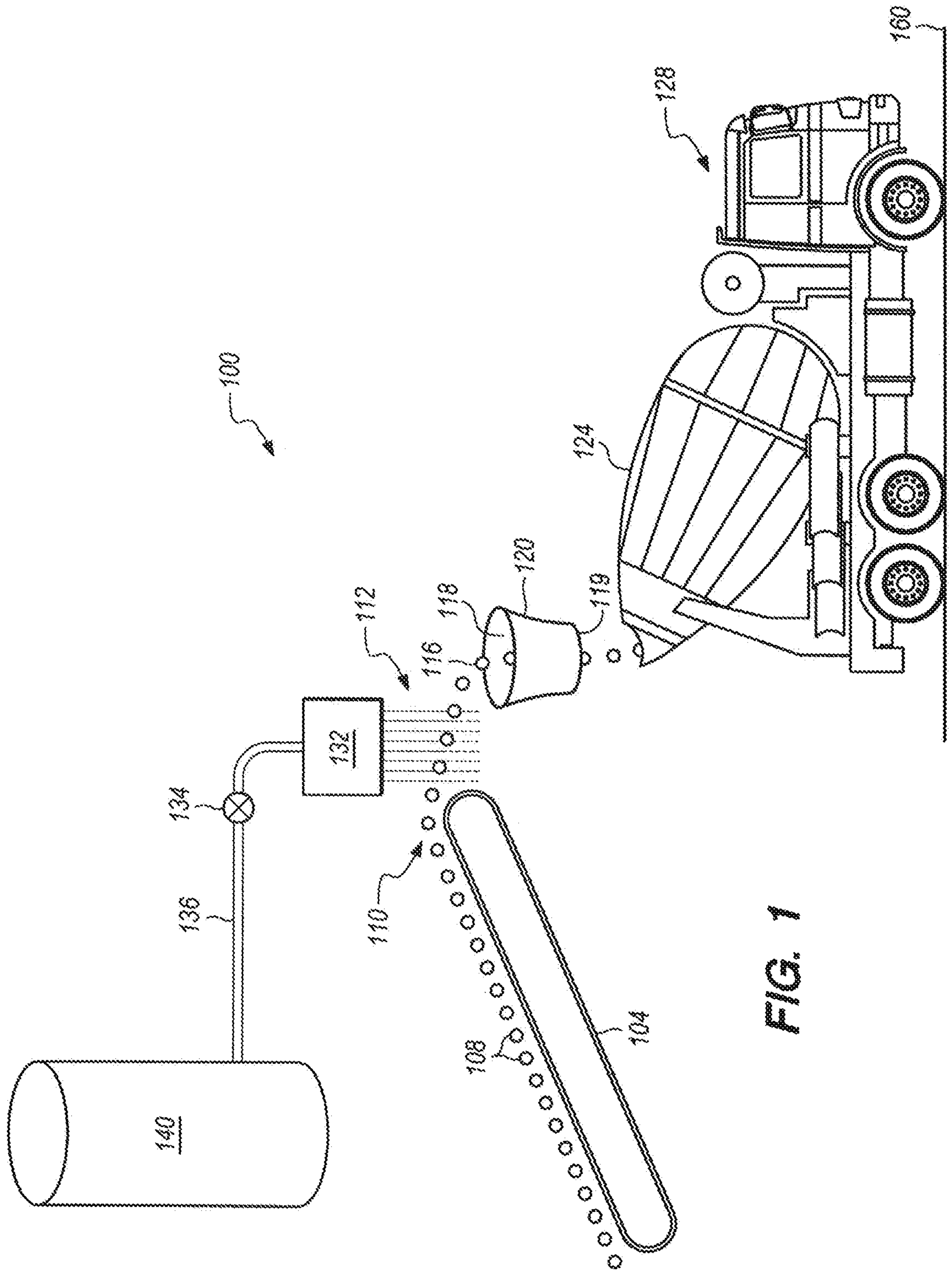
FIG. 1 illustrates an embodiment of a system that can be used for cooling aggregate, e.g., aggregate for use in a concrete mixture.

Companies that prepare concrete have tried various approaches over the years to try to cool a concrete mixture, prior to the concrete mixture being poured. For example, when a concrete mixture is batched from a concrete batching plant and disposed in a concrete mixing chamber, such as the chamber of a mixing truck, large amounts of ice have been added to the concrete mixture. The thought is that the ice will partially cool the mixture. However, this requires time, labor, and the cost of the ice to perform this additional step of adding ice to the concrete mixing chamber. Moreover, when the ice melts inside the mixing chamber, the resulting water impacts the ratio of ingredients used to make the concrete. There is a limit to how much ice can be added, as the resulting water will at some point dilute the concrete mixture beyond acceptable limits.

Concrete can be a mixture of aggregate, cement, and water—in appropriate portions. In this industry, aggregate refers to one or more pieces of gravel or rock particles. The aggregate can be of different aggregate sizes, including sand. The sand can be of different degrees of coarseness. In one embodiment, approximately eighty percent of the weight of a concrete mixture is from the aggregate component. For high strength concrete, one can mix the aggregate with fifteen percent by weight cement and five percent by weight water. For lower strength concrete, one can mix the aggregate with ten percent by weight cement and ten percent by weight water. Typically, concrete is prepared at a concrete batching plant. A concrete batching plant stockpiles the constituents required for making concrete, namely the aggregate, cement, and water. When a batch of concrete is prepared, each of these constituents is added to a mixing chamber via the batching plant equipment. For example, a front end loader can be used to move a load of gravel onto a conveyance device. The conveyance device can be used to transport the aggregate to the mixing chamber. Similarly, the cement can be transported to the mixing chamber. A piping system can be configured to dispense water from above the mixing chamber, as well.

Another technique that has been used in the past to cool a concrete mixture has involved the use of a wand to spray nitrogen gas onto the contents of a concrete mixture inside a concrete mixing truck after the concrete mixture is added to the mixing chamber of the concrete mixing truck. Namely, the concrete mixing truck is first routed to a first station or loading position in a loading yard. At this point, aggregate and other constituents of the concrete can be loaded into the mixing chamber of the concrete mixing truck. Once all the concrete constituents have been added to the mixing chamber of the concrete mixing truck, the truck is routed to a second station in the loading yard. At this second station, an operator manually inserts a long wand into the mixing chamber of the concrete mixing truck. The operator uses the wand to spray nitrogen gas onto the constituents of the concrete mixture. The nitrogen gas has a much lower temperature than ice; however, the cold gas also ends up being sprayed onto the internal surface of the truck's mixing chamber. The cold gas freezes the metal of the truck's mixing chamber and leads to a rapid deterioration of the metal in the mixing chamber. Thus, while the wand system can cool the concrete mixture to a lower temperature relative to the process of simply adding ice to the concrete mixture, damage is caused to the mixing chambers of the concrete mixing trucks when the wand system is used. Moreover, the second station required for an operator to manually use a wand on the concrete mixture adds additional time to the loading process and requires additional manual labor. It is similar to the extended time and labor required to de-ice a plane prior to take off from an airport on a drizzly winter night. After passenger loading, the plane must pull away from the gate to a second station in order to undergo a de-icing procedure. Both processes are labor intensive and time consuming.

FIG. 1 illustrates an embodiment of a system that can be used for cooling aggregate, e.g., aggregate for use in a concrete mixture. In accordance with this embodiment, aggregate can be cooled by applying liquid nitrogen to the aggregate prior to the aggregate entering a mixing chamber. By cooling the aggregate with liquid nitrogen prior to the aggregate being added to the mixing chamber, a significant cooling of the aggregate can be accomplished without the concern of causing excessive damage to the metal components of the mixing chamber. Moreover, liquid nitrogen can be used which has a greater ability to cool than does nitrogen gas. This is because liquid nitrogen stays colder for a longer amount of time after contacting the aggregate than does nitrogen gas.

Liquid nitrogen is nitrogen in a liquid state at an extremely low temperature. It is a colorless clear liquid with a density of 0.807 g/ml at its boiling point (−195.79° C. (77 K; −320° F.)) and a dielectric constant of 1.43. It is produced industrially by fractional distillation of liquid air. Liquid nitrogen is often referred to by the abbreviation, LN2 or "LIN" or "LN" and has the UN number 1977. Liquid nitrogen is a diatomic liquid, which means that the diatomic character of the covalent N bonding in N2 gas is retained after liquefaction.

An embodiment of an aggregate cooling system is shown in FIG. 1. In system 100 of FIG. 1, an aggregate conveyance device is used to convey the aggregate. A conveyance device can be a conveyor belt or a chute, for example. In FIG. 1, a conveyor belt 104 can transport aggregate 108 or a mixture of aggregate, and/or cement. The moving aggregate on the conveyance device is referred to herein as an aggregate stream. The conveyor transports the contents of the conveyor belt at a sufficient velocity so that the contents will have a trajectory that projects the contents from the end 110 of the conveyor to the entry port 118 of a processing chute 120. The aggregate or aggregate and cement mixture is then conveyed through the chute and out of the exit port 119 of the chute and into a mixing chamber of a concrete mixing device, e.g., mixing chamber 124 of a concrete mixing truck 128 positioned in a designated loading area 160. Further constituents, such as water and cement can also be added to the mixing chamber and mixed together to form a concrete mixture.

In FIG. 1, a curtain of liquid nitrogen 112 is disposed in the pathway of the aggregate or aggregate and cement combination. A curtain of liquid nitrogen is intended to mean a predominantly continuous sheet of liquid nitrogen having a width, a height, and a depth, e.g., like a waterfall. It is not intended that the curtain must form a completely solid sheet of fluid; however, it is envisioned that the best results will be obtained if the generated flow of liquid nitrogen is interrupted as little as possible. The curtain of liquid nitrogen is preferably a low pressure sheet of fluid, e.g., one that falls like a waterfall under the force of gravity but not under any hydraulic pressure. A spray of liquid nitrogen produced from a spray head or from a nozzle is not considered a curtain of liquid nitrogen, for purposes of this document. In FIG. 1, the curtain of liquid nitrogen is disposed so that it will contact the aggregate—or aggregate and cement—in its travel from the end of the conveyor to the entry port of the chute. The curtain of liquid nitrogen in this example is disposed so as not to contact sensitive metal parts of the concrete batching process machinery. Liquid nitrogen has a temperature of about −320 degrees Fahrenheit at atmospheric pressure. As the liquid nitrogen gains heat by its exposure to ambient temperature, the liquid nitrogen warms and undergoes a phase change to nitrogen gas. Thus, the curtain of liquid nitrogen shown in FIG. 1 does not reach the ground—the liquid nitrogen changes into nitrogen gas before it can reach the ground. While nitrogen gas is quite cold, a greater cooling of the aggregate—or aggregate and cement—can be achieved by flowing the material(s) through liquid nitrogen, as opposed to through nitrogen gas.

Because the liquid nitrogen is extremely cold, it can damage components of the batching equipment, such as metal or rubber parts of a conveyor belt system or a metal chute system. Therefore, a conveyor device is preferably disposed in a location and operated in a manner that directs the contents conveyed by the conveyor device through the liquid nitrogen curtain, while still keeping the liquid nitrogen curtain away from the conveyor device, so that the liquid nitrogen does not substantially contact the conveyor device in a way that would damage the conveyor device.

In FIG. 1, aggregate cooled by the liquid nitrogen is shown as material 116. Because the liquid nitrogen is so cold, it has a substantial cooling effect on the aggregate that passes through the liquid nitrogen curtain 112. Moreover, some of the liquid nitrogen is carried by the aggregate into the concrete mixture in the mixing chamber for further cooling effect. By carrying the liquid nitrogen into the mixing chamber, the liquid nitrogen can continue to cool the aggregate. In contrast to prior systems that sprayed nitrogen gas on the surface of an entire concrete mixture, the system shown in FIG. 1 can allow for liquid nitrogen to be carried into the mixing chamber and mixed throughout the entire volume of the concrete mixture in the mixing chamber—not just on the outer surface of the concrete mixture. Thus, using liquid nitrogen in this manner provides a more thorough cooling of the concrete mixture in the mixing chamber. Moreover, because the liquid nitrogen is disposed on the aggregate, it is less likely that it will touch the metal surface of the mixing chamber in comparison to the wand method described above.

In FIG. 1, a liquid nitrogen storage tank 140 supplies liquid nitrogen under pressure via pipeline 136 to a converter device 132. A valve 134 may be used to control the flow of liquid nitrogen to the converter device. The converter device converts the pressurized input of liquid nitrogen to an unpressurized flow of liquid nitrogen. An output port of the converter outputs the unpressurized liquid nitrogen as a curtain of liquid nitrogen. Thus, the converter device can serve as a liquid nitrogen dispenser. The aggregate can be flowed through the curtain of liquid nitrogen.

Figure 2:
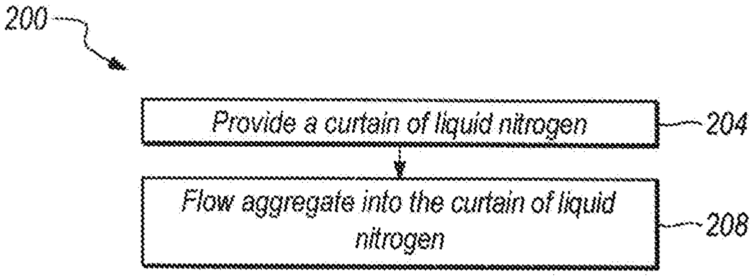
FIG. 2 is a flow chart that illustrates a method of cooling aggregate in accordance with one embodiment.

FIG. 2 is a flow chart that illustrates a method 200 in accordance with one embodiment. In operation block 204, a curtain of liquid nitrogen is provided. And, in operation block 208, aggregate is flowed into the curtain of liquid nitrogen.

Figure 3:
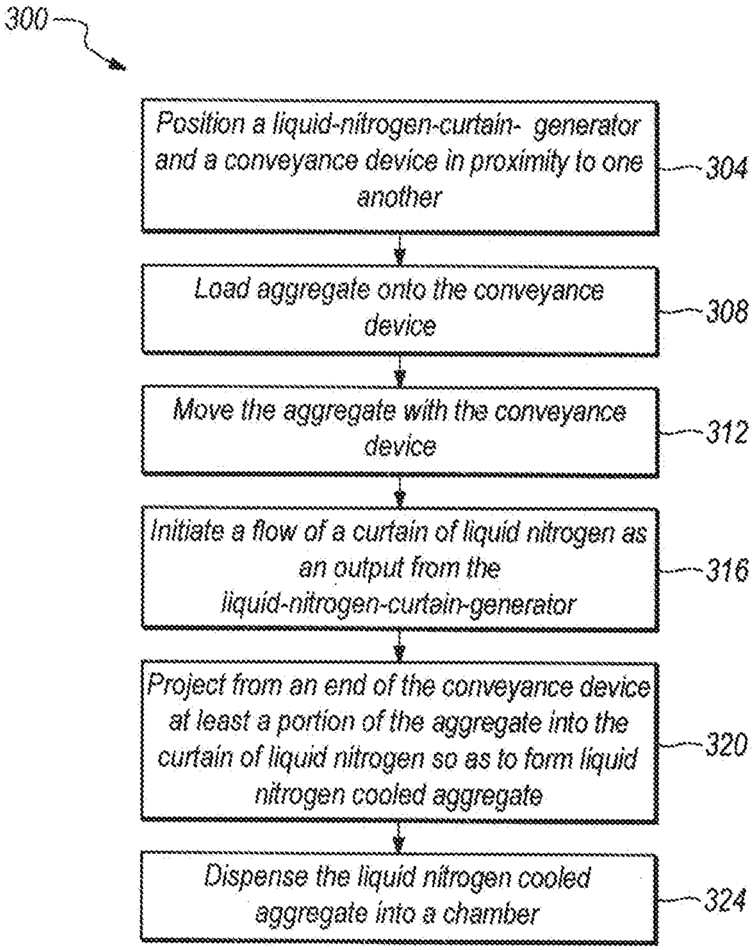
FIG. 3 is a flow chart that illustrates a method of cooling aggregate in accordance with another embodiment.

A more detailed flow chart that illustrates a method in accordance with one embodiment is shown in FIG. 3. FIG. 3 illustrates a method 300 of cooling aggregate for use as part of a concrete mixture. In operation block 304, a dispenser in the form of a liquid-nitrogen-curtain-generator and a conveyance device are positioned in proximity to one another. In operation block 308, aggregate is loaded onto the conveyance device. In operation block 312, the aggregate is moved by the conveyance device. And, in operation block 316, a flow of a curtain of liquid nitrogen is initiated as an output from the liquid-nitrogen-curtain-generator. In operation block 320, the conveyance device projects from the end of the conveyance device at least a portion of the aggregate into the curtain of liquid nitrogen. This causes the aggregate to be cooled by the liquid nitrogen, thus forming liquid-nitrogen-cooled-aggregate. And, in operation block 324, the liquid nitrogen cooled aggregate is dispensed into a chamber. The chamber can be part of a mixing device, such as a concrete mixing truck. Or, the chamber might be part of temporary storage device.

Figure 4:
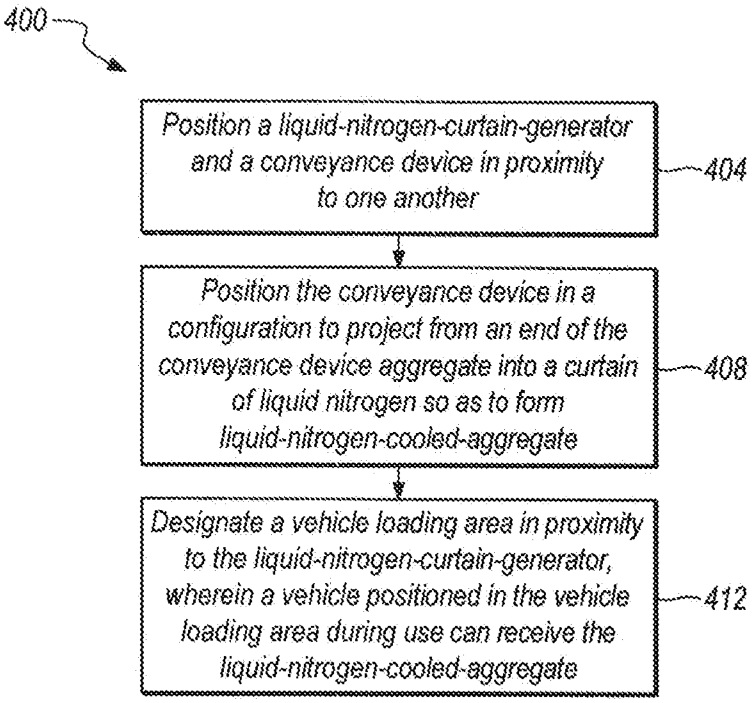
FIG. 4 is a flow chart that illustrates a method of cooling aggregate in accordance with yet another embodiment.

FIG. 4 shows a flow chart that illustrates an alternative method 400. In operation block 404, a liquid-nitrogen-curtain-generator and a conveyance device are positioned in proximity to one another. In operation block 408, the conveyance device is configured to project from the end of the conveyor aggregate into a curtain of liquid nitrogen. The aggregate is cooled by the curtain of liquid nitrogen so as to become liquid-nitrogen-cooled-aggregate. In operation block, 412, a loading area in proximity to the liquid-nitrogen-curtain-generator is designated as a vehicle loading area. And, a vehicle positioned in the vehicle loading area can receive the liquid-nitrogen-cooled-aggregate. Alternatively, a temporary storage device can be positioned in the vehicle loading area and the temporary storage device can receive the liquid-nitrogen-cooled-aggregate.

Figure 5:
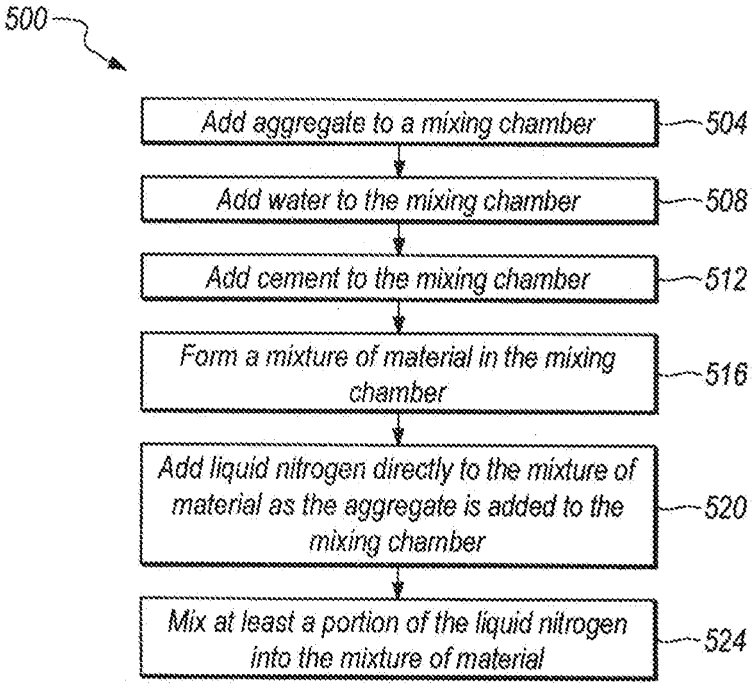
FIG. 5 is a flow chart that illustrates a method of forming a concrete mixture from liquid-nitrogen-cooled-aggregate in accordance with one embodiment.

As noted above, concrete is formed by different constituents, such as aggregate, cement, and water. The aggregate is responsible for most of the mass of the concrete. Therefore, cooling of the aggregate is believed to be the greatest contributor to the cooling of the concrete mixture. At one point during the mixing process, the concrete mixture is comprised of aggregate cooled by the liquid nitrogen, cement, water, and in some cases liquid nitrogen that was carried into the mixture by the aggregate during the addition of the aggregate. FIG. 5 is a flow chart that illustrates a method of forming a concrete mixture from liquid-nitrogen-cooled-aggregate. In operation block 504, aggregate is added to a mixing chamber, e.g., a mixing chamber of a mixing vehicle. In operation block 508, water is added to the mixing chamber. In operation block 512, cement is added to the mixing chamber. In operation block 516, a mixture of material is formed in the mixing chamber. In operation block 520, liquid nitrogen is added directly to the mixture of material at the same time that the aggregate is added to the mixing chamber. The aggregate can actually carry the liquid nitrogen into the mixing chamber. And, in operation block 524, at least a portion of the liquid nitrogen is mixed into the mixture of material.

Figure 6:
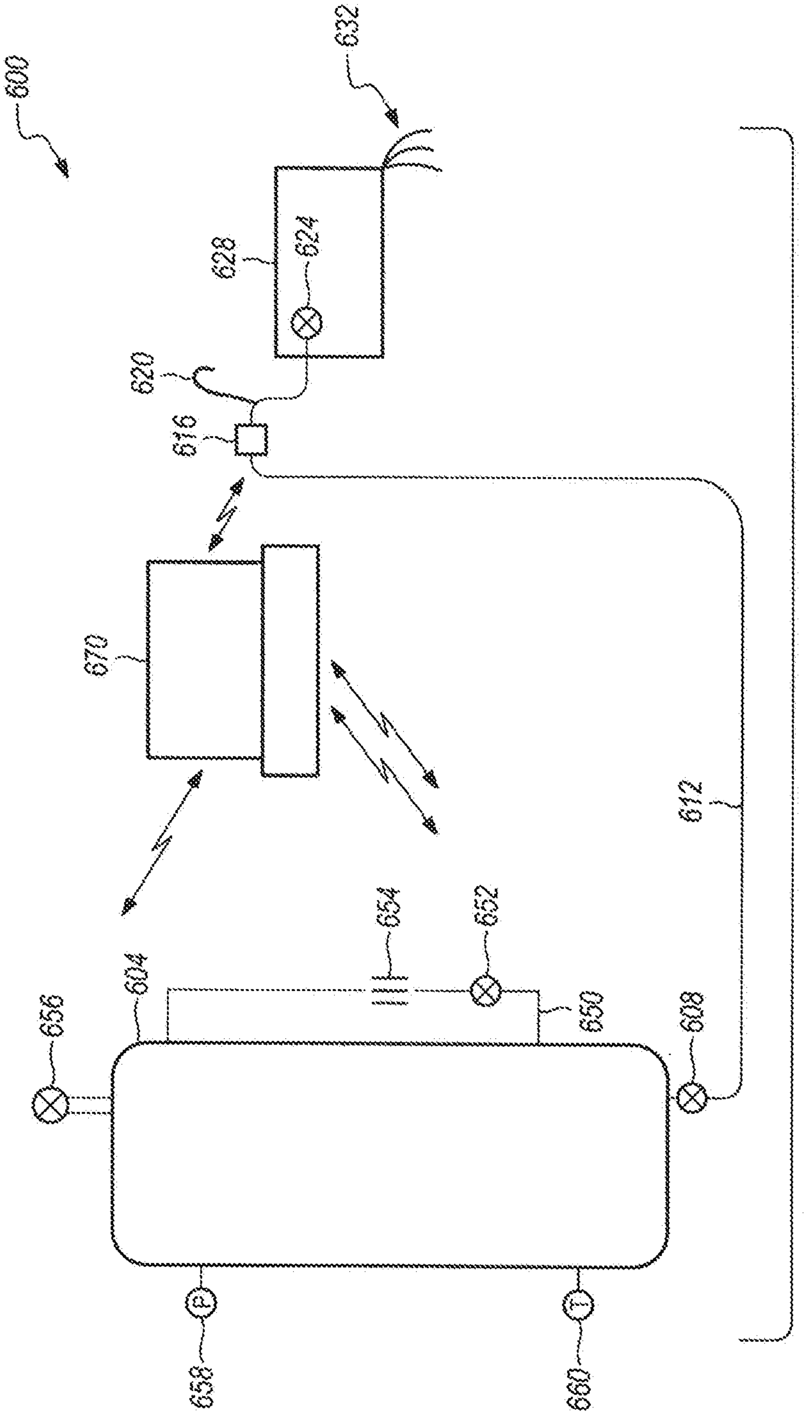
FIG. 6 illustrates an embodiment of a system for supplying liquid nitrogen in accordance with one embodiment.

FIG. 6 illustrates an embodiment of a system for supplying liquid nitrogen. In system 600, liquid nitrogen is stored in a storage tank 604. A piping system made of insulated copper tubing connects the storage tank with a liquid nitrogen dispenser 628. An isolation valve 608 allows liquid nitrogen to be released from the tank and into the insulated copper tubing. The tubing is routed in a manner that allows it to gain height toward a cryovent 616. If enough heating of the liquid nitrogen occurs, the liquid nitrogen can undergo a phase change to nitrogen gas. Thus, the upward routing of the copper tubing allows gas from such a phase change to travel upwards to the cryovent and to be released to the atmosphere. For safety code purposes a "candy cane" vent 620 is also present to permit venting of gas that builds up in the piping system. An additional solenoid valve 624 is present in liquid nitrogen dispenser 628. This additional solenoid valve permits liquid nitrogen to be supplied to the liquid nitrogen dispenser when the solenoid valve is placed in an open position.

It is preferable to sub-cool the liquid nitrogen in the liquid nitrogen tank so that the liquid nitrogen will not change phase to nitrogen gas in the piping system prior to being dispensed by the liquid nitrogen dispenser 628. The liquid nitrogen can gain heat from the insulated copper tubing and will lose pressure as it is transported through the tubing. Moreover, the liquid nitrogen is not always constantly flowing in the copper tubing. An operator might dispense a first volume of liquid nitrogen while loading a first concrete mixing truck and then shut off the valves while the first concrete mixing truck is moved out of loading position and a second concrete mixing truck is moved into loading position. During that time period, liquid nitrogen remains in the piping between valve 608 and valve 624. If the time period is lengthy, there might be enough of a heat gain experienced by the liquid nitrogen in that expanse of piping to cause some of the liquid nitrogen to change phase to nitrogen gas. This would significantly reduce the cooling effect of the system, as there is a substantial difference between the cooling effect of liquid nitrogen and the cooling effect of nitrogen gas, i.e. the cooling effect of liquid nitrogen is much greater than the cooling effect of nitrogen gas.

Moreover, when liquid nitrogen changes phase from liquid to gas, it expands. For example, nitrogen gas expands at a ratio of 694 times the original volume of liquid nitrogen, at 68 degrees Fahrenheit. Thus, when liquid nitrogen changes phase in the tubing 612 it can have the effect of creating a back pressure on the liquid nitrogen storage tank—effectively shutting off or at least reducing the flow of liquid nitrogen from the storage tank. When this takes place, it can be difficult for any liquid nitrogen to reach the valve 624. As stated above, one solution to this problem is to sub-cool the liquid nitrogen. Sub-cooling the liquid nitrogen helps to reduce the chance that the liquid nitrogen will gain enough heat or lose enough pressure between the storage tank and the valve 624 to change phase to nitrogen gas. Namely, by sub-cooling the liquid nitrogen by a few degrees Fahrenheit, one can reduce the chance that the liquid nitrogen will change phase in route to the liquid nitrogen dispenser.

To facilitate sub-cooling, the pressure generator system is shut off by closing valve 652 and opening venting valve 656. This allows some of the liquid nitrogen in the tank to boil—as it is exposed to atmospheric pressure—and thus cools the remaining liquid nitrogen in the tank. After a selected amount of cooling has been accomplished, the vent valve 656 is closed and the pressure generator circuit is opened by opening valve 652. In one embodiment, a maximum pressure controller can be installed with the vent valve 656 in order to accurately manage the flow of liquid to the input port of the liquid nitrogen dispenser.

The pressure generating circuit 650 allows pressure to be maintained in the storage tank in order to move liquid nitrogen to a distribution device. When valve 652 is opened, liquid nitrogen can move upward through the pipe to expansion device 654. The expansion device allows a portion of the liquid nitrogen to convert to nitrogen gas. Nitrogen gas has a much greater volume than liquid nitrogen. For example, nitrogen gas expands at a ratio of 694 times the original volume of liquid nitrogen, at 68 degrees Fahrenheit. Thus, the addition of the nitrogen gas to the closed container system increases the internal pressure on the liquid nitrogen stored in the storage tank. Pressure sensor 658 and temperature sensor 660 can provide feedback to computing device 670 via an electrical signal and via a wireless or wired communication. And, a computerized control system, e.g., computer implemented liquid nitrogen control system 670, can signal valve 652 to open and close as needed to reach the appropriate operating pressure in the storage tank, again via an electrical signal and via a wireless or wired communication.

Figure 7:
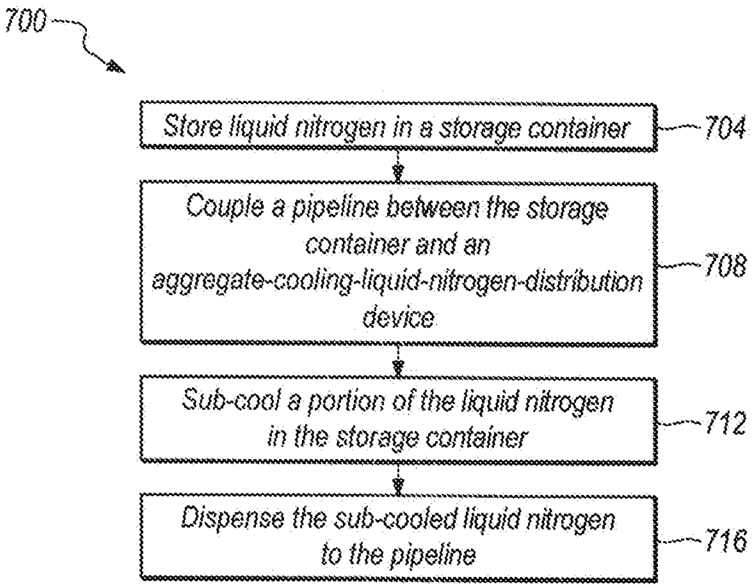
FIG. 7 is a flow chart that illustrates a method that can be used to dispense sub-cooled liquid nitrogen in accordance with one embodiment.

FIG. 7 is a flow chart that illustrates an embodiment of a method 700 that can be used to dispense sub-cooled liquid nitrogen. In operation block 704, liquid nitrogen is stored in a container. In operation block 708, a pipeline is coupled between the storage container and a liquid-nitrogen-distribution device, such as device 900 in FIG. 9 or system 1200 in FIG. 12. In operation block 712, a portion of the liquid nitrogen in the storage container is sub-cooled. In operation block 716, the sub-cooled liquid nitrogen is dispensed to the pipeline for routing to the aggregate-cooling-liquid-nitrogen-distribution device.

Figure 8:
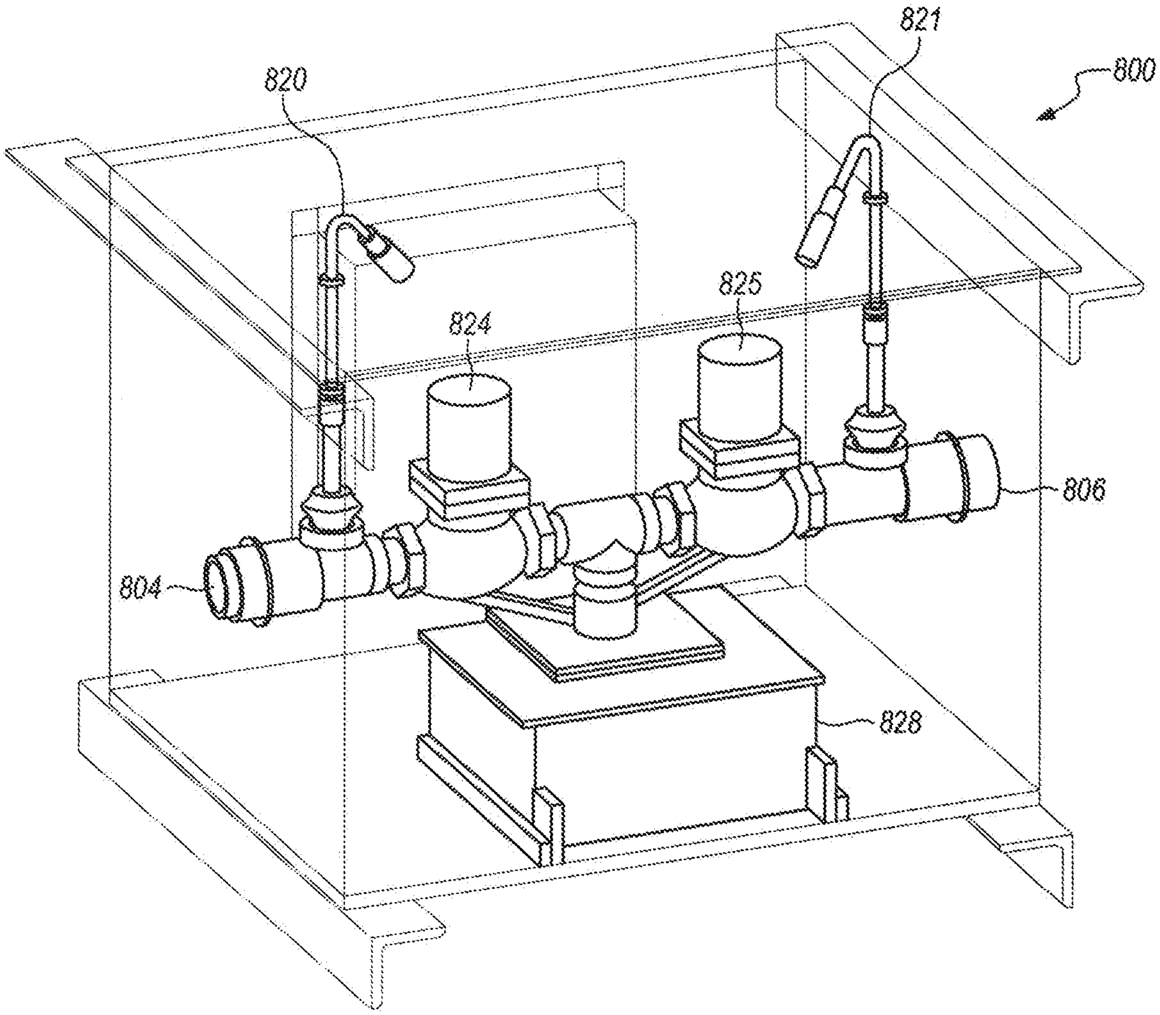
FIG. 8 a liquid-nitrogen-distribution device in accordance with one embodiment.

FIG. 8 illustrates an embodiment of a liquid-nitrogen-distribution device that can be used in the system shown in FIG. 1. The device 800 shown in FIG. 8 is shown as having redundant liquid nitrogen supply ports. The supply piping from a liquid nitrogen storage tank can be connected to either entry port of device 800. If the piping is connected at entry port 804, then valve 825 remains in a closed position and candy cane vent 821 is not used. Valve 824 can be opened to allow liquid nitrogen to flow to liquid nitrogen dispenser 828 and candy cane vent 820 can function as normal.

Similarly, if the piping is attached to entry port 806, then valve 824 remains in a closed position and candy cane vent 820 is not used. Valve 825 can be opened to allow liquid nitrogen to flow to liquid nitrogen dispenser 828 and candy cane vent 821 can function as normal.

In one embodiment, supply piping may be connected to both entry ports. In this configuration, an operator can choose which entry port to open to permit a supply of liquid nitrogen. Moreover, in one embodiment the operator might even choose to use both entry ports to supply liquid nitrogen at the same time.

Figure 9:
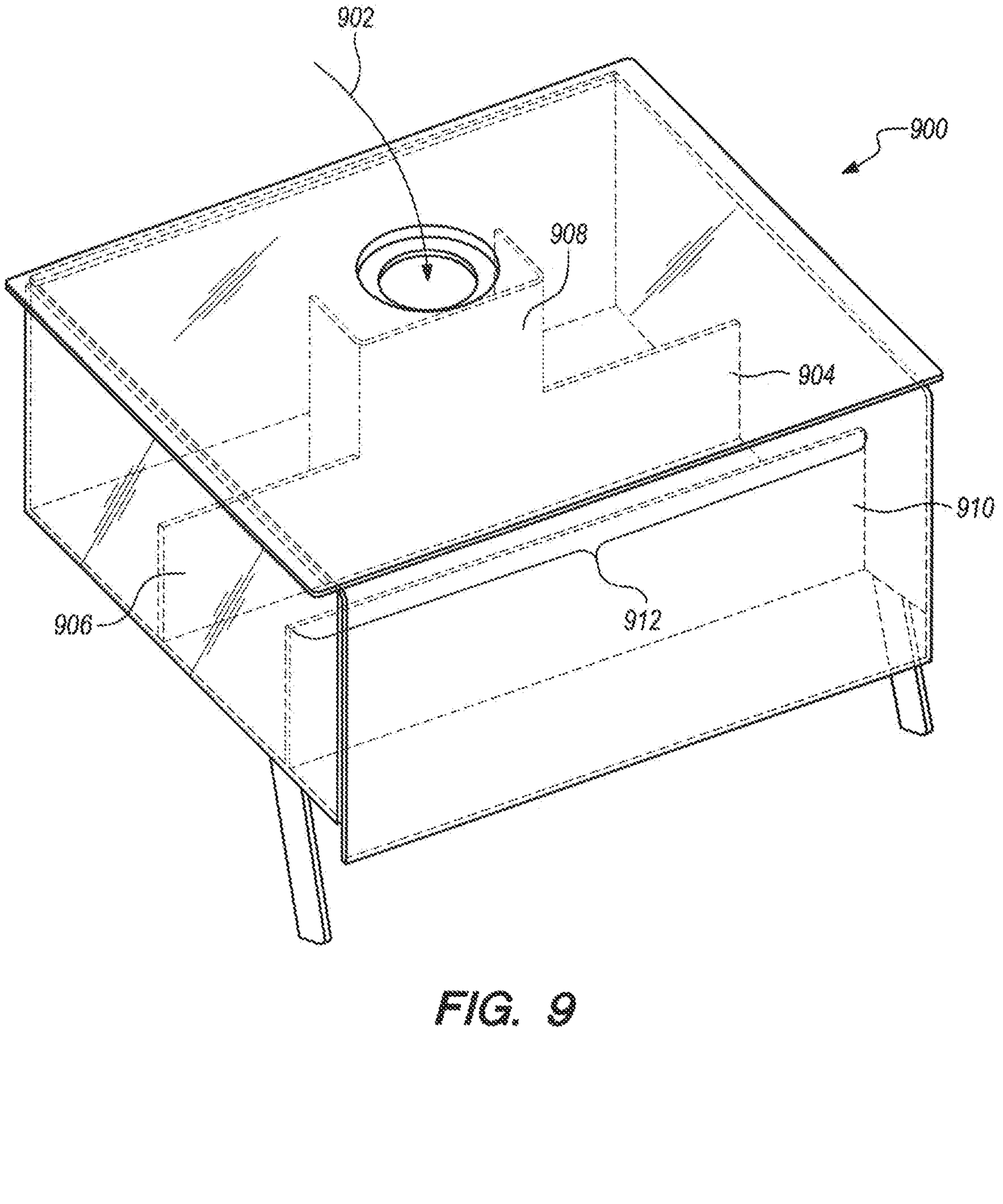
FIG. 9 illustrates a liquid nitrogen dispenser in accordance with one embodiment.

FIG. 9 illustrates an embodiment of a liquid nitrogen dispenser 900. An input port 902 provides an entry point for liquid nitrogen to be input into the liquid nitrogen dispenser. A first baffle 908 is disposed in the generally box shaped receiving chamber of the liquid nitrogen dispenser. The first baffle 908 has a generally U-shaped configuration and receives the incoming liquid nitrogen. The first baffle can extend from the top surface of the receiving chamber to the bottom surface of the receiving chamber. The generally U-shaped first baffle acts as a deflector and redirects or deflects the flow of the incoming liquid nitrogen into the back portion of the receiving chamber of the liquid nitrogen dispenser and initially away from an output port 912 of the liquid nitrogen dispenser located in the front portion of the liquid nitrogen dispenser. FIG. 9 shows wall projections 904 and 906 or “wings” on either side of the first baffle that extend from the baffle 908 to the sidewalls of the box shaped receiving chamber. The wings do not extend the entire height of the first baffle. In the embodiment shown in FIG. 9, the wings extend one half the height of the first baffle. The combination of the first baffle and the wings roughly divide the large volumetric space of the receiving chamber into a back portion and a forward portion. The large volumetric space of the receiving chamber allows the liquid nitrogen to be depressurized. For example, if the liquid nitrogen entering the receiving chamber is under a hydraulic pressure of approximately 20 pounds per square inch (psi), this hydraulic pressure can be reduced to zero psi by exposing the liquid nitrogen to the large volumetric space of the receiving chamber at atmospheric pressure and ambient temperature, e.g., 68 degrees Fahrenheit. Moreover, the first baffle and the wings on either side of the first baffle prevent the incoming flow of liquid nitrogen from immediately being exposed to the output port of the liquid nitrogen dispenser. The first baffle also assist in slowing down the incoming liquid nitrogen. For example, if the liquid nitrogen enters the chamber at a first velocity, it can be dispersed by the first baffle into the receiving chamber. Moreover, the side wings and first baffle combination hold the liquid nitrogen in the back portion of the receiving chamber until the level of liquid nitrogen in the receiving chamber rises above the height of the wings 904 and 906.

A slight angle of decline is given to the bottom of the liquid nitrogen dispenser to assist in causing the flow of liquid nitrogen to flow toward the output port under the force of gravity.

In one embodiment, the output port 912 of the liquid nitrogen dispenser is a slot-like opening in the receiving chamber. In the example shown in FIG. 9, the front baffle 910 extends from the bottom of the liquid nitrogen dispenser to within about ½ inch from the top of the liquid nitrogen dispenser. As the volume of liquid of liquid nitrogen in the forward portion of the box like chamber increases, the level of liquid nitrogen will rise. Once the level of liquid nitrogen in the chamber reaches the height of the slot-like opening, the liquid nitrogen will flow out of the slot-like opening. The slot-like opening allows the liquid nitrogen to fall like a waterfall over the edge of the front baffle 910. The slot-like opening can have a pre-determined length to control the shape of the curtain of liquid nitrogen. Because the hydraulic pressure on the liquid nitrogen has been removed, the liquid nitrogen flows like a waterfall out of the liquid nitrogen dispenser and creates a curtain-like flow of liquid nitrogen. Moreover, because the hydraulic pressure has been removed from the liquid nitrogen, the liquid nitrogen is not sprayed out of the liquid nitrogen dispenser. In one embodiment, the dimensions of the curtain of liquid nitrogen can be eight inches high by twelve inches wide by 0.5 inches thick.

In other embodiments, a different series of baffles might be used. However, in accordance with one embodiment, it is preferable to use a baffle arrangement that reduces the hydraulic pressure from the input liquid nitrogen and produces a curtain-like flow of liquid nitrogen out of the liquid nitrogen dispenser.

In another embodiment, the slot could be formed by creating a gap between the bottom surface of the liquid nitrogen dispenser and the front baffle 910.

The components of the liquid nitrogen dispenser are preferably made from copper, brass, and/or stainless steel. These materials are resistive to damage caused by the extreme cold temperatures of liquid nitrogen.

Figure 10:
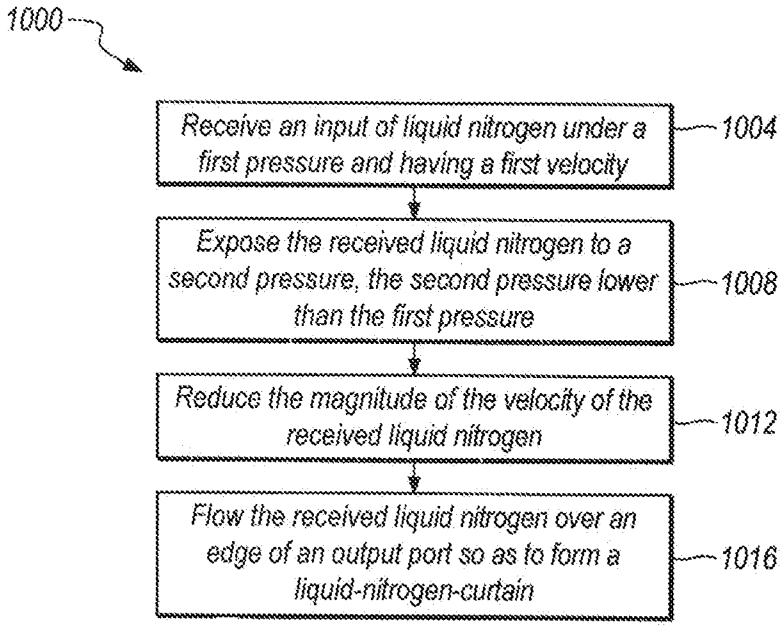
FIG. 10 is a flow chart that illustrates a method of generating a liquid-nitrogen curtain in accordance with one embodiment.

FIG. 10 illustrates another example of a method 1000 of generating a liquid-nitrogen curtain. In operation block 1004, an input of liquid nitrogen that is under a first pressure, such as a high pressure, is received via an input port. The pressurized liquid nitrogen is received having a first velocity. In operation block 1008, the received liquid nitrogen is exposed to a second pressure in the receiving chamber, such as atmospheric pressure. The second pressure is lower than the first pressure. In operation block 1012, the magnitude of the velocity of the received liquid nitrogen is reduced. For example, the use of a baffle or deflector and a receiving chamber can be used to reduce the velocity. And, in operation block 1016, the received liquid nitrogen can be output by flowing the liquid nitrogen over the edge of an output port having a pre-determined length and width so as to form a liquid-nitrogen-curtain.

In accordance with one embodiment, the process of supplying liquid nitrogen can be automated. For example, in the system of FIG. 6, a computerized control system, such as computer implemented liquid nitrogen control system 670, can be provided that is communicatively coupled with valves 656 and 652 and storage tank pressure sensor 658 and liquid nitrogen temperature sensor 660. The computer implemented liquid nitrogen control system, valves, and sensors can be communicatively coupled through the use of electrical signals that are transmitted by wireless or wired communication. The computer implemented liquid nitrogen control system can receive input signals from the sensors and control the sub-cooling of the storage tank contents by operating valves 652 and 656, as explained above. Alternatively, the liquid nitrogen storage system could have its own dedicated control system that controls the sub-cooling operation. In that instance, the dedicated control system could receive a signal from the liquid nitrogen control system that indicates the sub-cooling desired for the storage system.

Similarly, the computer implemented liquid nitrogen control system can control the dispensing of liquid nitrogen to the liquid nitrogen dispenser. This could be accomplished in accordance with one embodiment by configuring valves 608 and 624 to be electrically coupled with computer implemented liquid nitrogen control system 670. The computer implemented liquid nitrogen control system can open both valves to dispense liquid nitrogen and close both valves when liquid nitrogen is not required. Moreover, the computer implemented liquid nitrogen control system can be electrically coupled with a batching plant controller. The dispensing of the liquid nitrogen can be coordinated by the computer implemented liquid nitrogen control system to coincide with the delivery of a load of aggregate from the conveyance device. For example, initiation of the dispensing of the liquid nitrogen can be performed so that a liquid nitrogen curtain is established just prior to aggregate being projected from the conveyance device toward a receiving chamber, such as the mixing chamber of a cement mixing truck.

While the embodiments discussed so far have been directed at creating a curtain that is directed at the flow of material between the conveyance device and the input chute (i.e., where the liquid nitrogen curtain is not disposed directly above the conveyor), it should be appreciated that in some embodiments, an operator might choose to position the curtain directly above the conveyance device. It is envisioned that one would choose this implementation when the conveyance device could be made from materials that are not damaged by the temperature of liquid nitrogen. Similarly, one might use the system to distribute liquid nitrogen on a pile of aggregate prior to loading of the aggregate onto a conveyance device.

Figure 11:
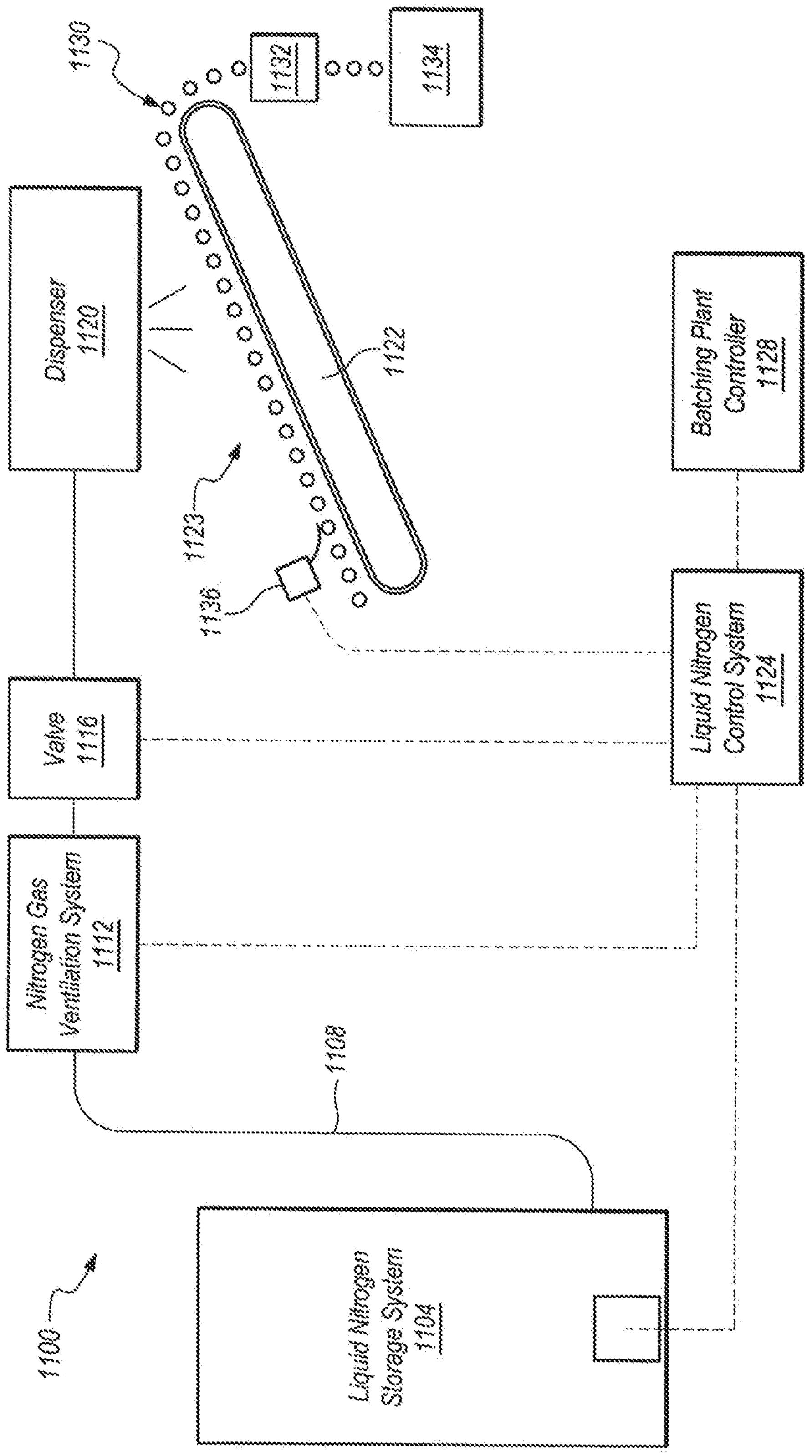
FIG. 11 illustrates an embodiment of a system that can be used to dispense liquid nitrogen in accordance with one embodiment.

FIG. 11 illustrates another embodiment for dispensing liquid nitrogen onto aggregate. Such a system can be used in the concrete mixing process, for example. In system 1100, a liquid nitrogen storage vessel 1104 stores a supply of liquid nitrogen. A portion of the stored liquid nitrogen can be conveyed via a piping system 1108 to a nitrogen gas ventilation system 1112. In accordance with one embodiment, the Cryocomp #K2041 nitrogen gas ventilation system manufactured by Cryocomp, Inc. of Kenilworth, NJ, can be utilized.

The piping system connects various system components. The nitrogen gas ventilation system removes at least a portion of any nitrogen gas received from the piping system and vents that nitrogen gas from the piping system. In some instances, the liquid nitrogen will gain heat as the liquid nitrogen is piped from the storage vessel 1104. If sufficient heat is gained by the liquid nitrogen, the liquid nitrogen will vaporize to nitrogen gas in the piping system. Preferably, that nitrogen gas is vented from the piping system to eliminate back pressure on the liquid nitrogen storage vessel as well as to allow a constant flow of liquid nitrogen to the liquid nitrogen dispenser 1120. A valve 1116 is shown for controlling the output flow of liquid nitrogen to the dispenser. When the valve is opened, a flow of liquid nitrogen can be output from the valve to the dispenser 1120.

In the embodiment shown in FIG. 11, the dispenser is shown in a position directly above the conveyance device 1122, e.g., directly above a conveyor belt. The conveyance device is shown carrying aggregate 1123. The dispenser outputs liquid nitrogen onto the surface of the aggregate while the aggregate is still on the conveyance device. The aggregate is cooled by the liquid nitrogen. The liquid nitrogen cooled aggregate 1130 is shown as being directed off the end of the conveyance device and into a chute 1132. The chute 1132 directs the cooled aggregate into a chamber 1134, such as the mixing chamber of a concrete mixing truck.

The liquid nitrogen stored in the storage vessel 1104 can be cooled to a pre-determined temperature. For example, the temperature of the liquid nitrogen can be sub-cooled to a temperature that prevents vaporization of the liquid once the liquid nitrogen is conveyed to the nitrogen gas ventilation system. By reducing the temperature of the liquid nitrogen by a pre-determined amount, the liquid nitrogen will not be able to gain enough heat in the piping system to vaporize before the liquid nitrogen reaches the nitrogen gas ventilation system. For example, liquid nitrogen has a vapor point of −297 degrees Fahrenheit at a pressure of 52 pounds per square inch (psi). By sub-cooling the stored liquid nitrogen to −308 degrees Fahrenheit at 30 psi, one can reduce the chance of vaporization within the piping system when a portion of the liquid nitrogen is distributed to via the piping system.

If for some reason, nitrogen vapor does enter the piping system 1108, the nitrogen gas ventilation system can remove the nitrogen vapor by venting the nitrogen vapor to the atmosphere.

The system shown in FIG. 11 can be controlled automatically. For example, a computerized control system, such as computer implemented liquid nitrogen control system 1124, can be communicatively coupled with a liquid nitrogen storage system 1104, a nitrogen gas ventilation system 1112, a valve 1116, a computer implemented batching plant controller 1128, and/or conveyance device sensor(s) 1136. Not all communicative couplings are required, however.

By coupling the liquid nitrogen control system with the batching plant controller, the batching plant controller can send an input signal to the liquid nitrogen control system to indicate when to initiate and cease dispensing liquid nitrogen; how much liquid nitrogen to dispense; and how cold the liquid nitrogen should be, for example. Alternatively, the liquid nitrogen control system could be programmed to control these features independently of a batching plant controller.

By communicatively coupling the liquid nitrogen control system to valve 1116, the liquid nitrogen control system can control dispensing of liquid nitrogen. This allows the liquid nitrogen control system to control when and for how long a portion of the liquid nitrogen is conveyed to the dispensing head(s) and dispensed onto the aggregate, i.e., initiation and cessation. The liquid nitrogen control system can also control the amount of liquid nitrogen dispensed per time (e.g., the rate of dispensing) and the pressure at which the liquid nitrogen is dispensed by controlling the degree to which the valve is opened.

By communicatively coupling the liquid nitrogen control system with conveyance system sensor(s), the liquid nitrogen control system can determine when to initiate and cease dispensing liquid nitrogen. For example, if a sensor detects aggregate moving on the conveyance system, the liquid nitrogen control system could initiate dispensing of the liquid nitrogen. Similarly, when the sensor detects (1) that no more aggregate is present on the conveyance system; (2) that an insufficient quantity of aggregate is present on the conveyance system; or (3) that the conveyance system has stopped moving the aggregate, then the liquid nitrogen control system can signal that dispensing of liquid nitrogen should be terminated.

By communicatively coupling the liquid nitrogen control system with the liquid nitrogen storage system, the liquid nitrogen control system can signal an appropriate pressure or temperature that a liquid nitrogen storage tank should be maintained at for effective sub-cooling of the liquid nitrogen, e.g. a selected temperature below the vaporization temperature for liquid nitrogen at a selected pressure. Moreover, the liquid nitrogen control system can control the output of a portion of the stored liquid nitrogen to the piping system 1108.

The liquid nitrogen control system can also control the nitrogen gas ventilation system 1112. For example, in one embodiment, if sensors in the piping system detect back pressure being exerted on the liquid nitrogen in the piping system, the nitrogen gas ventilation system could be invoked by the liquid nitrogen control system to ventilate the nitrogen gas.

Figure 12:
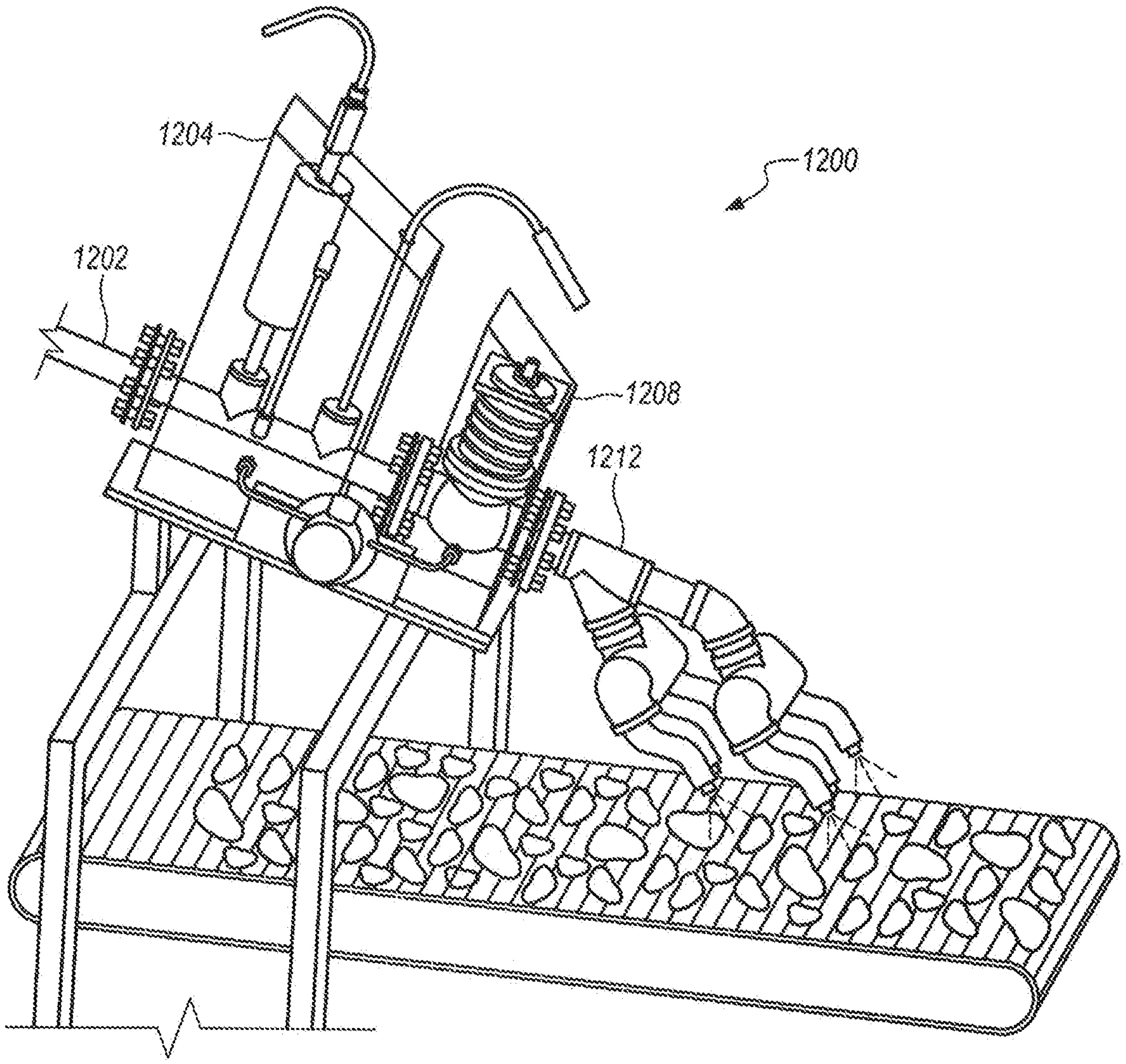
FIG. 12 illustrates a system for dispensing liquid nitrogen directly onto aggregate being carried by a conveyance device in accordance with one embodiment.

FIG. 12 illustrates a system 1200 for dispensing liquid nitrogen onto aggregate carried by a conveyance device, in accordance with one embodiment. FIG. 12 shows a conveyance device in the form of a conveyor belt. The conveyor belt carries aggregate underneath a liquid nitrogen dispenser 1212.

The dispenser 1212 can be, for example, a manifold with one or more dispensing heads—e.g., nozzles—that are positioned to direct their respective output streams onto the aggregate. Preferably, the dispensing heads are configured to direct their respective output streams so as to cause minimal contact between any metal parts or rubber parts and the dispensed liquid nitrogen. This will reduce damage to those parts. For example, the embodiment shown in FIG. 12 shows a dispenser having six dispensing heads. The dispensing heads are arranged in two rows of three dispensing heads in each row. The dispensing heads could be configured to produce different types of output, e.g., conical flow or generally planar flow. If generally planar output flow is used for all of the nozzles, one could arrange each head in one of the rows to have a different angle of incidence relative to the generally planar surface of the conveyor device, e.g, relative to a surface plane of a conveyor belt. This would allow the outermost dispensing heads to direct their output flow at angles of incidence relative to the surface of the generally planar surface of the conveyance device that would preferably not contact any metal or rubber surfaces of the conveyance device. The middle dispensing head could direct its output flow perpendicular to the surface plane of the conveyor device, as there would be less concern about contacting metal or rubber parts in the middle of the aggregate stream. Allowing different angles of incidence relative to the surface of the aggregate stream permits implementation in concrete batching plants of various configurations and implementations.

During operation, the dispensing heads can also be positioned as close as possible to the top of the aggregate stream conveyed by the conveyance device. By positioning the dispensing heads in this fashion, there is less opportunity for the dispensed liquid nitrogen to convert to nitrogen gas before impacting the aggregate.

Moreover, the dispensing from the dispensing heads can be performed at very low pressures. In accordance with one embodiment, the liquid nitrogen can be dispensed at a pressure less than 80 psi but greater than 0 psi. In accordance with yet another embodiment, the liquid nitrogen can be dispensed at a pressure less than about 30 psi but greater than 0 psi. In accordance with yet another embodiment, the liquid nitrogen can be dispensed at a pressure less than 15 psi but greater than 0 psi. Using a low pressure will help prevent the liquid nitrogen from changing phase to nitrogen gas when it is dispensed from the dispensing head(s). Liquid nitrogen provides a greater cooling effect than nitrogen gas due to liquid nitrogen's ability to maintain its cold temperature while contacting the aggregate. Dispensing the liquid nitrogen at more than 0 psi helps to disturb the top layer of aggregate in an aggregate stream. Disturbing the top layer(s) of aggregate forces the top layer(s) out of the way so that underlying layers of aggregate can be exposed to the liquid nitrogen as well. Thus, dispensing the liquid nitrogen at appropriate pressures to disturb the top layer(s) of aggregate can be useful. In accordance with one embodiment, the liquid nitrogen can be dispensed at a pressure between about 80 psi and about 3 psi. In accordance with another embodiment, the liquid nitrogen can be dispensed at a pressure between about 30 psi and about 3 psi. In accordance with yet another embodiment, the liquid nitrogen can be dispensed at a pressure between about 15 psi and about 3 psi.

FIG. 12 also shows that a piping system 1202 supplies liquid nitrogen from a liquid nitrogen storage vessel (not shown). A nitrogen gas venting system 1204 can optionally be used to remove any nitrogen gas that has vaporized in the piping system. A nitrogen gas ventilator vents the nitrogen gas from the piping system and allows the liquid nitrogen to pass further downstream. A safety vent can also be incorporated as part of the nitrogen gas venting system. FIG. 12 also shows a valve 1208. The valve receives an input of liquid nitrogen. When the valve is opened, the liquid nitrogen is output to the dispenser 1212.

Figure 13:
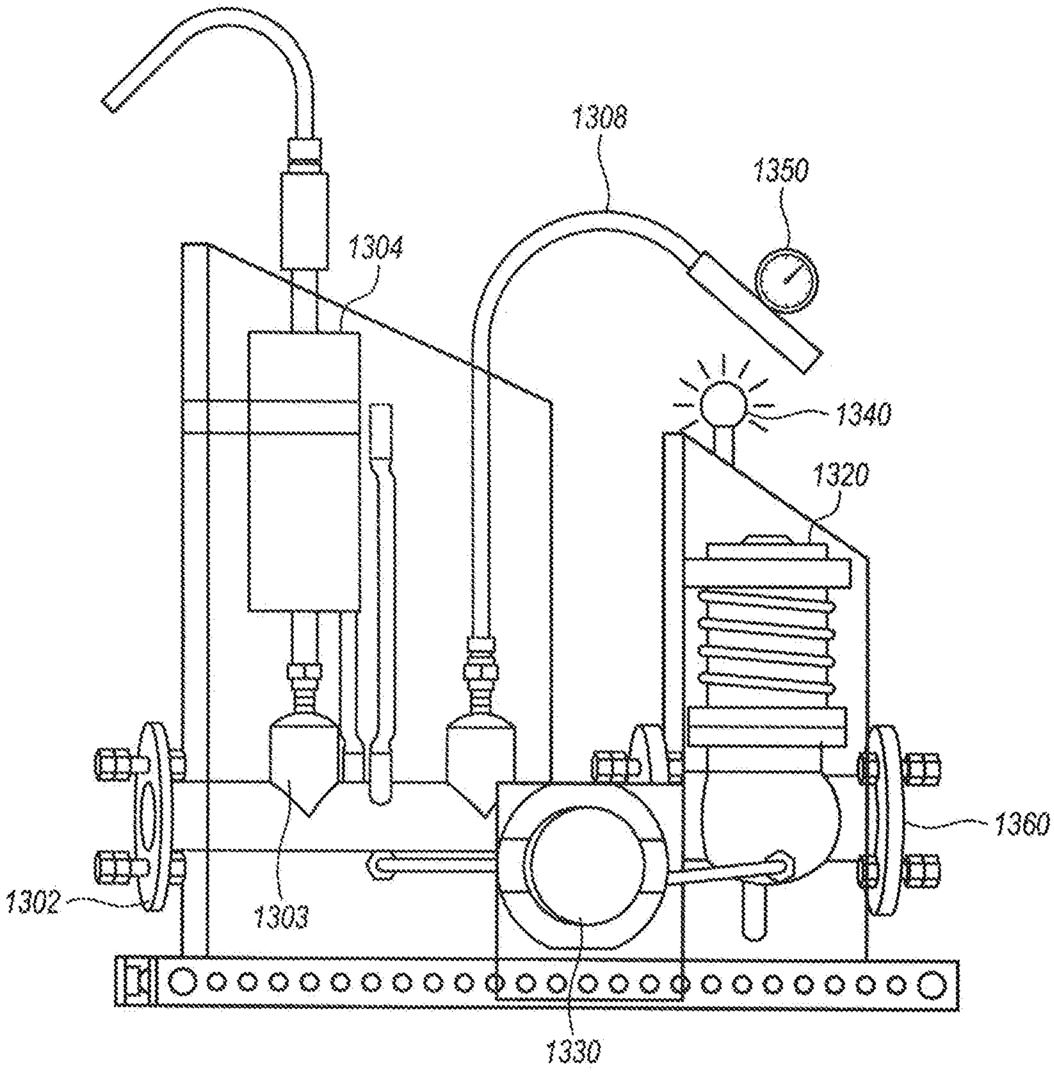
FIG. 13 illustrates a system for supplying liquid nitrogen in accordance with one embodiment.

FIG. 13 shows a side view of a nitrogen gas ventilation system and valve. A flange 1302 is shown to receive liquid nitrogen supply piping. A tee-fitting 1303 is shown that allows nitrogen gas present in the piping system to move upward to nitrogen gas ventilator 1304. The nitrogen gas ventilator can be opened to allow the nitrogen gas to be vented to the atmosphere. A control cable can be routed from a control system, such as the liquid nitrogen control system described above, to the nitrogen gas ventilator via junction box 1330. Thus, in one embodiment, the control system can control when the nitrogen gas should be ventilated. In another embodiment, the ventilator can act independently.

A safety ventilator 1308 is also shown teed off from the piping that connects the input supply piping with valve 1320. If pressure exceeds a predetermined safety limit, the safety ventilator will allow nitrogen gas or liquid nitrogen to be expelled from the system to the atmosphere. A gauge 1350 optionally allows an operator to view the pressure in the system.

The piping from the flange 1302 to valve 1320 conveys the input of liquid nitrogen. Valve 1320 can be operated manually or automatically. If operated automatically, a control signal can be routed from the control system via junction box 1330 to valve 1320. In one embodiment, a signal, such as signal light 1340 can signal when the valve is in an open position. A hose or further piping can connect the output port of the valve via flange 1360 to a liquid nitrogen dispenser. This permits the dispenser to be mounted remotely from the valve and the nitrogen gas ventilation system.

Figure 14:
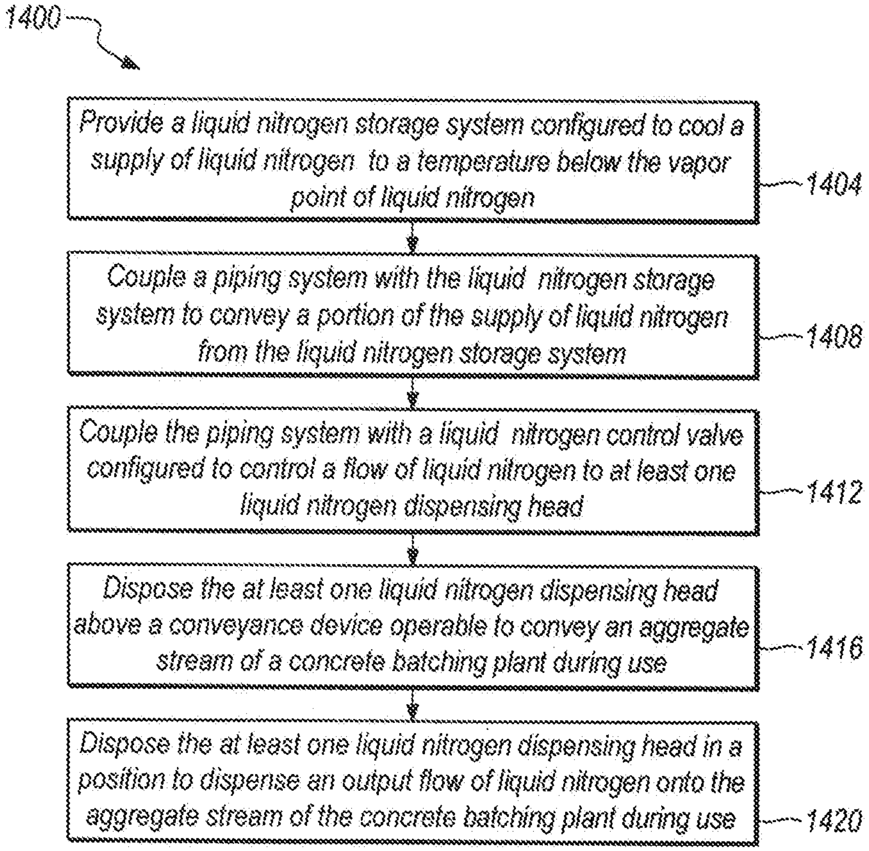
FIG. 14 is a flow chart that illustrates a method of configuring a system for cooling aggregate in accordance with one embodiment.

FIG. 14 is a flow chart 1400 that illustrates a method of configuring a system for cooling aggregate in accordance with one embodiment. In operation block 1404, a liquid nitrogen storage system is supplied. The liquid nitrogen storage system is configured to cool a supply of liquid nitrogen to a temperature below the vapor point of liquid nitrogen. In operation block 1408, a piping system is mechanically coupled with the liquid nitrogen storage system in order to convey a portion of the supply of liquid nitrogen away from the liquid nitrogen storage system. In operation block 1412, the piping system is also mechanically coupled with a liquid nitrogen control valve. The liquid nitrogen control valve is configured to control an output flow of liquid nitrogen to at least one liquid nitrogen dispensing head. In operation block 1416, the dispensing head(s) is disposed above a conveyance device. During use, the conveyance device can convey an aggregate stream as part of a concrete batching plant. In operation block 1420, the dispensing head(s) are disposed in a position to dispense an output flow of liquid nitrogen onto the aggregate stream of the concrete batching plant during use.

Figure 15:
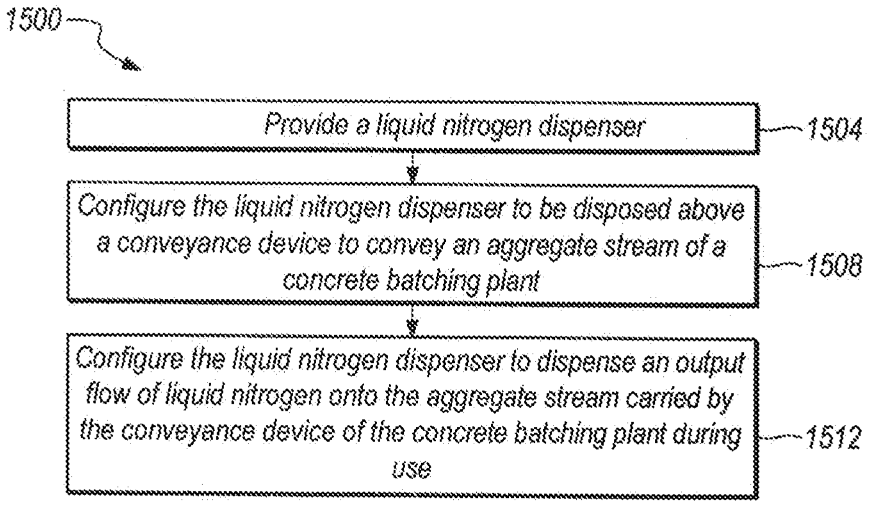
FIG. 15 is a flow chart that illustrates a method of configuring a liquid nitrogen dispenser in accordance with another embodiment.

FIG. 15 is a flow chart 1500 that illustrates a method of configuring a liquid nitrogen dispenser for use in a concrete batching plant, in accordance with another embodiment. In operation block 1504, a liquid nitrogen dispenser is provided. In operation block 1508, the liquid nitrogen dispenser is configured to be disposed above a conveyance device. The conveyance device can convey an aggregate stream of a concrete batching plant during use. In operation block 1512, the liquid nitrogen dispenser is also configured to dispense an output flow of liquid nitrogen onto the aggregate stream carried by the conveyance device of the concrete batching plant during use.

In the embodiments described above, cooling of aggregate can be accomplished. The use of a greater amount of liquid nitrogen can produce a greater cooling effect on the aggregate. Thus, an operator can control the amount of cooling that is implemented by controlling the amount of liquid nitrogen that is applied to the aggregate. In one embodiment, it is believed that dispensing the output flow of liquid nitrogen at a rate sufficient to reduce the initial average surface temperature of the aggregate in the aggregate stream by at least three degrees Fahrenheit will provide a useful cooling of the concrete mixture.

Figure 17:
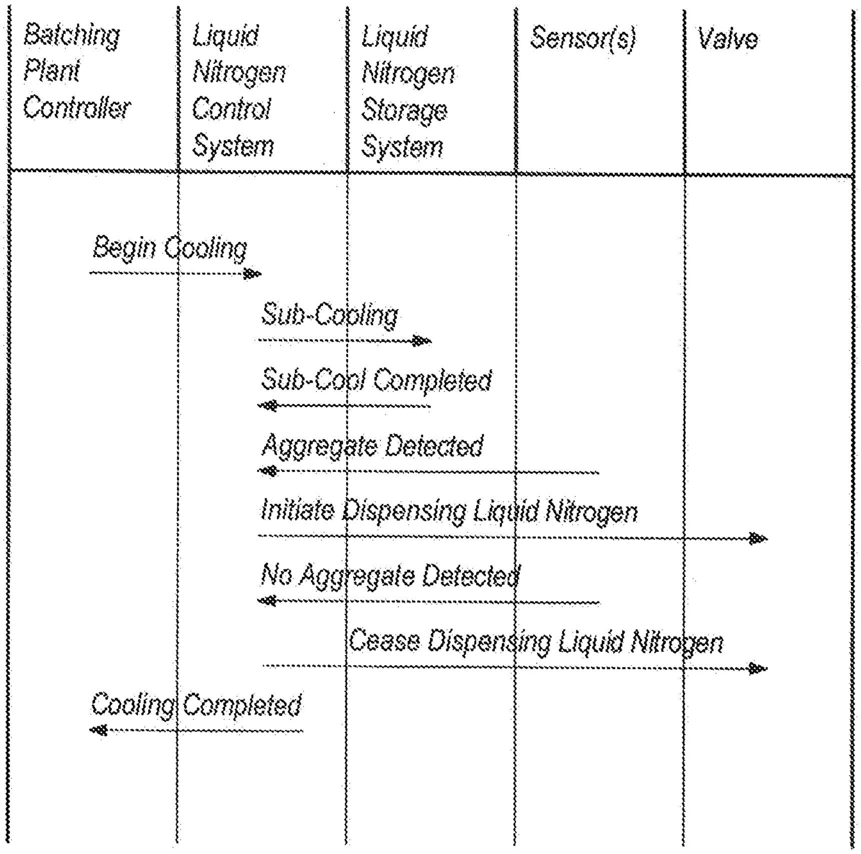
FIG. 17 illustrates a sequence diagram in accordance with one embodiment.

FIG. 17 illustrates an example of a sequence of operations for controlling a cooling process. In FIG. 17, a liquid nitrogen control system is communicatively coupled with a batching plant controller, a liquid nitrogen storage system, one or more sensors, and a dispensing valve. In this example, the batching plant controller sends a signal to the liquid nitrogen control system to begin cooling aggregate. The liquid nitrogen control system receives the signal and sends a signal to the liquid nitrogen storage system to cool the liquid nitrogen to the desired parameters. Once the sub-cooling is completed, the liquid nitrogen storage system sends a signal back to the liquid nitrogen control system indicating that sub-cooling is complete. Independently or in response to a signal from the liquid nitrogen control system, the batching plant controller can initiate the conveyance system to begin transporting aggregate. One or more sensors can detect the aggregate on the conveyance system and send a signal to the liquid nitrogen control system that aggregate has been detected or that aggregate is beneath a liquid nitrogen dispensing head. The liquid nitrogen control system can send a signal to the valve that controls dispensing of the liquid nitrogen to open. Moreover, the liquid nitrogen control system can send a signal that indicates to what degree the valve should be opened. This allows the liquid nitrogen control system to control the amount of cooling that is implemented—more liquid nitrogen being dispensed produces a greater cooling effect on the aggregate. When the sensor(s) detect that no more aggregate is present on the conveyance system, the sensor(s) can send a signal to the liquid nitrogen control system, indicating that fact. The liquid nitrogen control system can then send a signal to the valve to close and thus cease dispensing liquid nitrogen. Once the liquid nitrogen control system is finished with the dispensing of liquid nitrogen, the liquid nitrogen control system can send a signal to the batching plant controller indicating that the cooling has been completed. While the example in FIG. 17 has been described as a scenario where the batching process controller initiates the process, it should be appreciated that it is also possible to operate the liquid nitrogen control system independently of a batching process controller.

Figure 16:
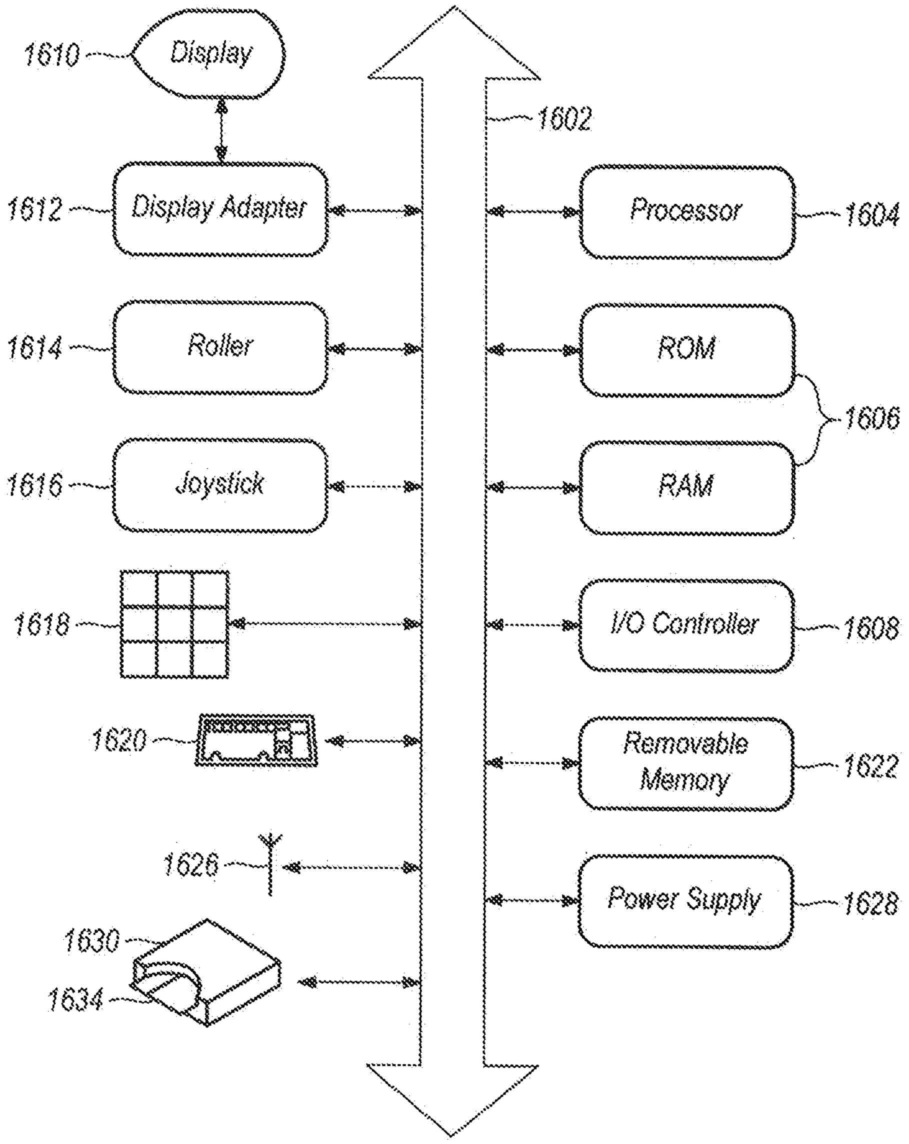
FIG. 16 illustrates a block diagram of a computer system that can be utilized to implement computer-based devices described herein.

FIG. 16 discloses a block diagram of a computer system 1600 suitable for implementing aspects of at least one embodiment of a computerized device. As shown in FIG. 16, system 1600 includes a bus 1602 which interconnects major subsystems such as a processor 1604, internal memory 1606 (such as a RAM and/or ROM), an input/output (I/O) controller 1608, removable memory (such as a memory card) 1622, an external device such as a display screen 1610 via a display adapter 1612, a roller-type input device 1614, a joystick 1616, a numeric keyboard 1618, an alphanumeric keyboard 1620, smart card acceptance device 1630 for smartcard 1634, a wireless interface 1626, and a power supply 1628. Many other devices can be connected. Wireless interface 1626 together with a wired network interface (not shown), may be used to interface to a local or wide area network (such as the Internet) using any network interface system known to those skilled in the art.

Many other devices or subsystems (not shown) may be connected in a similar manner. Also, it is not necessary for all of the devices shown in FIG. 16 to be present to practice an embodiment. Furthermore, the devices and subsystems may be interconnected in different ways from that shown in FIG. 16. Code to implement one embodiment may be operably disposed in the internal memory 1606 or stored on storage media such as the removable memory 1622, a floppy disk, a thumb drive, a CompactFlash® storage device, a DVD-R ("Digital Versatile Disc" or "Digital Video Disc" recordable), a DVD-ROM ("Digital Versatile Disc" or "Digital Video Disc" read-only memory), a CD-R (Compact Disc-Recordable), or a CD-ROM (Compact Disc read-only memory). For example, in an embodiment of the computer system 1600, code for implementing the cooling system may be stored in the internal memory 1606 and configured to be operated by the processor 1604.

In the above description, for the purposes of explanation, numerous specific details are set forth in order to provide a thorough understanding of the embodiments described. It will be apparent, however, to one skilled in the art that these embodiments may be practiced without some of these specific details. For example, while various features are ascribed to particular embodiments, it should be appreciated that the features described with respect to one embodiment may be incorporated with other embodiments as well. By the same token, however, no single feature or features of any described embodiment should be considered essential, as other embodiments may omit such features.

In the interest of clarity, not all of the routine functions of the embodiments described herein are necessarily shown and described. It will, of course, be appreciated that in the development of any such actual embodiment, numerous implementation-specific decisions must be made in order to achieve the developer's specific goals, such as compliance with application and/or business-related constraints, and that those specific goals will vary from one embodiment to another and from one developer to another.

According to one embodiment, the components, process steps, and/or data structures disclosed herein may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination of hardware and software. The software may be stored on a program storage device readable by a machine.

According to one embodiment, the control operations performed by each control system described herein could be implemented by a programmable logic controller (PLC).

According to one embodiment, the components, processes and/or data structures may be implemented using machine language, assembler, PHP, C or C++, Java and/or other high level language programs running on a data processing computer such as a personal computer, workstation computer, mainframe computer, or high performance server running an OS such as Windows 10, Windows 8, Windows 7, Windows Vista™, Windows NT®, Windows XP PRO, and Windows® 2000, available from Microsoft Corporation of Redmond, Washington, Apple OS X-based systems, available from Apple Inc. of Cupertino, California, or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet or other networks. Different implementations may be used and may include other types of operating systems, computing platforms, computer programs, firmware, computer languages and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

It should be understood that operations recited in the claims are not limited to a particular order, unless explicitly claimed otherwise or a specific order is inherently necessitated by the claim language.

Many of the embodiments described herein have been described using liquid nitrogen as the cooling agent. In some applications, one might choose to use nitrogen slush. Nitrogen slush is comprised of solid nitrogen and liquid nitrogen. Nitrogen slush has a greater cooling effect than liquid nitrogen. Nitrogen slush can also be used to avoid the Leidenfrost effect.

The above specification, examples, and data provide a complete description of the structure and use of exemplary embodiments of the invention. Furthermore, structural features of the different implementations may be combined in yet another implementation without departing from the recited claims.

Additional examples of arrangements are set out below in the following clauses:

(1) A method of cooling a mixture containing aggregate, the method comprising:

positioning a liquid-nitrogen-curtain-generator and a conveyor in proximity to one another;

loading some aggregate onto the conveyor;

moving the aggregate with the conveyor;

initiating a flow of a curtain of liquid nitrogen as an output from the liquid-nitrogen-curtain-generator;

projecting from an end of the conveyor at least a portion of the aggregate into the curtain of liquid nitrogen so as to form liquid-nitrogen-cooled-aggregate;

dispensing the liquid-nitrogen-cooled-aggregate into a vehicle.

(2) The method of clause (1) wherein the liquid-nitrogen-curtain-generator and the conveyor are positioned so that the curtain of liquid nitrogen is not positioned above the conveyor.

(3) The method of clause (1) wherein the liquid-nitrogen-curtain-generator is positioned so that the curtain of liquid nitrogen changes to gas prior to reaching the vehicle.

(4) The method of clause (11) wherein dispensing the liquid-nitrogen-cooled-aggregate into the vehicle comprises:

liquid-nitrogen-cooled-aggregate carrying liquid nitrogen into a mixing chamber of a concrete mixer.

(5) The method of clause (4) wherein the liquid nitrogen is carried into a concrete mixture without touching the vehicle.

(6) A method comprising:

positioning a liquid-nitrogen-curtain-generator and a conveyor in proximity to one another;

wherein during use the conveyor is positioned to project from an end of the conveyor aggregate into a curtain of liquid nitrogen so as to form liquid-nitrogen-cooled-aggregate;

designating a vehicle loading area in proximity to the liquid-nitrogen-curtain-generator, wherein a vehicle positioned in the vehicle loading area during use can receive the liquid-nitrogen-cooled aggregate.

(7) A method of forming a concrete mixture, the method comprising:

adding aggregate to a mixing chamber of a mixing vehicle;

adding water to the mixing chamber of the mixing vehicle;

adding cement to the mixing chamber of the mixing vehicle;

forming a mixture of material in the mixing chamber of the mixing vehicle;

adding liquid nitrogen directly to the mixture of material as the aggregate is added to the mixing chamber of the mixing vehicle;

mixing at least a portion of the liquid nitrogen into the mixture of material.

(8) A method of forming a liquid-nitrogen-curtain, the method comprising:

receiving an input of liquid nitrogen under a first pressure and having a first velocity;

exposing the received liquid nitrogen to a second pressure, the second pressure lower than the first pressure;

reducing the magnitude of the velocity of the received liquid nitrogen;

flowing the received liquid nitrogen over an edge of an output port so as to form a liquid-nitrogen-curtain.

(9) The method of clause (8) wherein reducing the magnitude of the velocity of the received liquid nitrogen comprises:

routing the received liquid nitrogen into contact with one or more deflectors to reduce the magnitude of the velocity of the received liquid nitrogen.

(10) A method comprising:

storing liquid nitrogen in a storage container;

coupling a pipeline between the storage container and an aggregate-cooling-liquid-nitrogen-distribution-device;

sub-cooling a portion of the liquid nitrogen in the storage container;

dispensing the sub-cooled liquid nitrogen to the pipeline.

(11) The method of clause (10) wherein the sub-cooling inhibits an amount of liquid nitrogen dispensed to the pipeline from changing phase to gas prior to reaching the aggregate-cooling-liquid-nitrogen-distribution-device.

(12) The method of clause (10) wherein the act of sub-cooling comprises:

exposing a portion of the liquid nitrogen stored in the storage tank to a low enough pressure to allow the portion of the liquid nitrogen to convert to liquid nitrogen gas;

allowing heat to be removed from a remaining portion of the liquid nitrogen stored in the storage tank to assist in converting the portion of liquid nitrogen to liquid nitrogen gas.

(13) The method of clause (12) and further comprising:

removing the gas from the storage tank; and then re-pressurizing the liquid nitrogen stored in the storage tank.

(14) A method of cooling aggregate, the method comprising:

providing a liquid curtain of nitrogen;

flowing the aggregate into the curtain of liquid nitrogen.

(15) A system for cooling a mixture containing aggregate, the apparatus comprising:

a liquid-nitrogen-curtain-generator configured to output a curtain of liquid nitrogen during use;

a conveyor located proximate to the liquid-nitrogen-curtain-generator;

an end of the conveyor located proximate to the liquid-nitrogen-curtain-generator;

wherein the conveyor is configured to:

move some aggregate during use;

project from the end of the conveyor at least a portion of the aggregate into the curtain of liquid nitrogen so as to form liquid-nitrogen-cooled-aggregate;

wherein during use the system is configured to dispense liquid-nitrogen-cooled-aggregate into a vehicle.

(16) The system of clause (15) wherein the liquid-nitrogen-curtain-generator and the conveyor are positioned so that the curtain of liquid nitrogen is not positioned above the conveyor.

(17) The system of clause (15) wherein the liquid-nitrogen-curtain-generator is positioned so that the curtain of liquid nitrogen changes to gas prior to reaching the vehicle

(18) The system of clause (15) wherein during use the liquid-nitrogen-cooled-aggregate is able to carry liquid nitrogen into a mixing chamber of a concrete mixer.

(19) The system of clause (18) wherein during use the liquid nitrogen is carried into a concrete mixture without touching the vehicle.

(20) A system comprising:

a liquid-nitrogen-curtain-generator configured to output a curtain of liquid nitrogen during use;

a conveyor located proximate to the liquid-nitrogen-curtain-generator;

an end of the conveyor located proximate to the liquid-nitrogen-curtain-generator;

wherein the conveyor is configured to:

project from the end of the conveyor at least a portion of the aggregate into the curtain of liquid nitrogen so as to form liquid-nitrogen-cooled-aggregate;

a vehicle loading area in proximity to the liquid-nitrogen-curtain-generator, wherein a vehicle positioned in the vehicle loading area during use can receive the liquid-nitrogen-cooled aggregate.

(21) A concrete mixture comprising:

aggregate;

cement;

water;

liquid nitrogen carried into the mixture during an addition of some of the aggregate to the mixture.

(22) An apparatus for forming a liquid nitrogen curtain, the apparatus comprising:

an input port to receive an input flow of liquid nitrogen, the liquid nitrogen being under a first pressure and having a first velocity during use;

a chamber under a second pressure, the second pressure lower than the first pressure;

a deflector located within the chamber, the deflector operative during use to deflect the input flow of liquid nitrogen;

an output port having an edge of pre-determined length to facilitate an output flow of liquid nitrogen;

wherein during use the output flow of liquid nitrogen flowing over the edge forms a liquid-nitrogen-curtain.

(23) The apparatus of clause (22) wherein the input port and the deflector are positioned relative to one another so that during use a magnitude of the input flow of liquid nitrogen is reduced by the deflector.

(24) An apparatus comprising:

a storage container capable of storing liquid nitrogen;

an aggregate-cooling-liquid-nitrogen-distribution-device;

a pipeline coupling the storage container with the aggregate-cooling-liquid-nitrogen-distribution-device;

a sub-cooling control circuit operable to sub-cool liquid nitrogen stored in the storage container prior to dispensing the sub-cooled liquid nitrogen to the pipeline.

(25) The apparatus of clause (24) wherein the sub-cooling inhibits an amount of liquid nitrogen dispensed to the pipeline from changing phase to gas prior to reaching the aggregate-cooling-liquid-nitrogen-distribution-device.

(26) The apparatus of clause (24) wherein the sub-cooling control circuit is operable to:

open a valve coupled with the storage tank to expose a portion of the liquid nitrogen stored in the storage tank to a sufficiently low pressure to allow the portion of the liquid nitrogen to convert to liquid nitrogen gas; and close the valve.

(27) The apparatus of clause (26) wherein the sub-cooling control circuit is further operable to:

evacuate nitrogen gas from the storage tank;

re-pressurize the liquid nitrogen stored in the storage tank.

(28) A system for cooling aggregate, the system comprising:

a first device configured to provide a liquid curtain of nitrogen;

a second device configured to flow aggregate into the liquid curtain of nitrogen.

(29) An apparatus for cooling aggregate, the apparatus comprising an input port to receive an input supply of liquid nitrogen;

a converter to convert a pressurized input of liquid nitrogen to an unpressurized flow of liquid nitrogen;

an output port to output the unpressurized liquid nitrogen as a curtain of liquid nitrogen through which the aggregate can be flowed.

30) A concrete mixture comprising:

cement;

water; and aggregate cooled by liquid nitrogen prior to addition to the concrete mixture.

What is claimed is:

1. A system comprising:

a conveyance device comprising a conveyor belt configured to carry an aggregate stream;

a liquid nitrogen dispenser disposed above the conveyance device, the liquid nitrogen dispenser comprising a chamber defined at least in part by a first baffle, the first baffle at least partially defining a slotted output port with an edge of pre-determined length to facilitate an output flow of liquid nitrogen, the slotted output port configured to permit the liquid nitrogen to spill over the edge when a level of liquid nitrogen in the chamber exceeds a height of the first baffle; and a liquid nitrogen controller in communication with a control valve, the liquid nitrogen controller comprising memory storing computer-readable instructions that, when executed by the liquid nitrogen controller, transmits a control signal to the control valve to open the control valve and dispense the liquid nitrogen to the liquid nitrogen dispenser;

wherein the liquid nitrogen dispenser is configured to generate an output flow of liquid nitrogen that flows downward from the output port of the liquid nitrogen dispenser onto the aggregate stream carried by the conveyor belt.

2. The system of claim 1 wherein an initial average surface temperature of the aggregate in the aggregate stream is reduced by at least three degrees Fahrenheit by the output flow of liquid nitrogen onto the aggregate stream.

3. The system of claim 1 and further comprising:

a liquid nitrogen storage system configured to maintain a supply of liquid nitrogen at a temperature below the vapor point of liquid nitrogen.

4. The system of claim 1 wherein the liquid nitrogen dispenser comprises:

at least one liquid nitrogen dispensing head.

5. The system of claim 4 wherein the at least one liquid nitrogen dispensing head outputs liquid nitrogen at a pressure between about 80 psi and 0 psi.

6. The system of claim 1 wherein the liquid nitrogen dispenser is configured to generate the output flow of liquid nitrogen as a curtain of liquid nitrogen.

7. The system of claim 6 and further comprising:

an end of the conveyor belt located proximate to the liquid nitrogen dispenser;

wherein the conveyor belt is configured to:

project from the end of the conveyor belt at least a portion of the aggregate into the dispensed liquid nitrogen so as to form liquid-nitrogen-cooled-aggregate; and deposit the liquid-nitrogen-cooled-aggregate into the mixing chamber.

8. The system of claim 7 wherein the dispensed liquid nitrogen does not contact the conveyor belt upon being dispensed.

9. The system of claim 1 wherein the liquid nitrogen dispenser further comprises:

an input port to receive an input flow of liquid nitrogen, the liquid nitrogen being under a first pressure and having a first velocity; and a second baffle located within the chamber of the liquid nitrogen dispenser, the second baffle positioned between the input port and the slotted output port such that the second baffle deflects the input flow of liquid nitrogen.

10. The system of claim 1 further comprising:

a piping system coupled with a liquid nitrogen storage system to convey a portion of a liquid nitrogen supply from the storage system to the liquid nitrogen dispenser.

11. The system of claim 10 wherein the control valve is coupled with the piping system.

12. A system comprising:

a conveyor belt configured to carry an aggregate stream;

a liquid nitrogen dispenser comprising a chamber operable to hold a predetermined volume of liquid nitrogen, and a first baffle that at least partially defines a slotted output port above the conveyor belt, the slotted output port configured to facilitate an output flow of liquid nitrogen over an edge of the first baffle when a volume of liquid nitrogen in the chamber exceeds the predetermined volume; and a liquid nitrogen controller in communication with a control valve, the liquid nitrogen controller comprising memory storing computer-readable instructions that, when executed by the liquid nitrogen controller, transmits a control signal to the control value to open the control valve and dispense the liquid nitrogen to the liquid nitrogen dispenser;

wherein the liquid nitrogen dispenser is configured to generate an output flow of liquid nitrogen that flows from the output port of the liquid nitrogen dispenser onto the aggregate stream carried by the conveyor belt.

13. The system of claim 12, wherein the liquid nitrogen dispenser is configured to dispense the output flow in a downward direction such that the output flow falls onto the aggregate stream.

* * * * *